United States Patent
Stammers et al.

(10) Patent No.: US 10,917,317 B2
(45) Date of Patent: Feb. 9, 2021

(54) ENTERPRISE SLICE MANAGEMENT

(71) Applicant: Cisco Technology, Inc., San Jose, CA (US)

(72) Inventors: Timothy Peter Stammers, Raleigh, NC (US); Aeneas Sean Dodd-Noble, Andover, MA (US); Louis Gwyn Samuel, Swindon (GB); Oliver James Bull, Portishead (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/364,666

(22) Filed: Mar. 26, 2019

(65) Prior Publication Data
US 2020/0313983 A1    Oct. 1, 2020

(51) Int. Cl.
*H04L 12/24* (2006.01)
*G06F 9/455* (2018.01)
(Continued)

(52) U.S. Cl.
CPC .......... *H04L 41/5054* (2013.01); *G06F 9/455* (2013.01); *H04L 41/22* (2013.01);
(Continued)

(58) Field of Classification Search
CPC ................ H04L 41/5054; H04L 41/22; H04L 41/5048; G06F 9/455; G06F 3/0482; G06F 3/04847; H04W 28/24
(Continued)

(56) References Cited

U.S. PATENT DOCUMENTS 10,129,108 B2    11/2018 Vrzic
2016/0360408 A1*  12/2016 Senarath ............. H04L 41/0896
(Continued)

FOREIGN PATENT DOCUMENTS

WO          2017143047 A1    8/2017
WO     WO-2017143047 A1 *   8/2017  ............. H04W 8/08

OTHER PUBLICATIONS

Molly Powell, 5G Slicing Templates, Jan. 17, 2019, mollydpowellusblog.wordpress.com, https://mollydpowellusblog.wordpress.com/2019/01/17/5g-slicing-templates/ (Year: 2019).*
(Continued)

*Primary Examiner* — Zi Ye
(74) *Attorney, Agent, or Firm* — Edell, Shapiro & Finnan, LLC

(57) ABSTRACT

Techniques that provide enterprise slice management are described herein. In one embodiment, a method includes providing an enterprise service template to an enterprise, the enterprise service template comprising parameter input fields for indicating enterprise devices associated with the enterprise, services to be provided to the enterprise devices using a mobile network, and service options associated with the services; determining one or more mobile network services to be provided to a plurality of enterprise devices and one or more service options associated with the one or more mobile network services; identifying, based on the one or more mobile network services, an enterprise slice to provide the one or more mobile network services; and provisioning the enterprise slice based on the one or more mobile network services, the plurality of enterprise devices, and the one or more service options associated with the one or more mobile network services.

20 Claims, 17 Drawing Sheets

(51) Int. Cl.
H04W 28/24 (2009.01)
G06F 3/0484 (2013.01)
G06F 3/0482 (2013.01)

(52) U.S. Cl.
CPC ........ *H04L 41/5048* (2013.01); *G06F 3/0482* (2013.01); *G06F 3/04847* (2013.01); *H04W 28/24* (2013.01)

(58) Field of Classification Search
USPC .......................................................... 709/226
See application file for complete search history.

(56) References Cited

U.S. PATENT DOCUMENTS

2017/0054595 A1* 2/2017 Zhang ................. H04L 41/5048
2019/0238425 A1* 8/2019 Mladin ............... H04L 41/5048

OTHER PUBLICATIONS

Cisco, Cisco Ultra 5G Packet Core Solution, 2018, Cisco, White Paper (Year: 2018).*

3GPP Organizational Partners, "3rd Generation Partnership Project; Technical Specification Group Services and System Aspects; Telecommunication management; Key Performance Indicators (KPI) for Evolved Universal Terrestrial Radio Access Network (E-UTRAN); Requirements (Release 15)", 3GPP TS 32.451 V15.1.0, Dec. 2018, 13 pages.

Riccardo Guerzoni et al., "Analysis of end-to-end multi-domain management and orchestration frameworks for software defined infrastructures: an architectural survey", Transactions on Emerging Telecommunications Technologies, Sep. 13, 2016, 19 pages.

Sandra Ondrusova, "Cooperation on Generic Slice Template definition", SA WG2 Meeting #S2-129BIS S2-1811975, Document No. 5GJA05_110, Jul. 11, 2018, 56 pages.

Mohammad Asif Habibi et al., "The Structure of Service Level Agreement of Slice-based 5G Network", arXiv:1806.10426v1 [cs.NI], Jun. 27, 2018, 6 pages.

Android Developers, "NetworkCapabilities", https://developer.android.com/reference/android/net/NetworkCapabilities, downloaded Mar. 19, 2019, 22 pages.

Jose Ordonez-Lucena et al., "The Creation Phase in Network Slicing: From a Service Order to an Operative Network Slice", IEEE, Apr. 25, 2018, 6 pages.

* cited by examiner

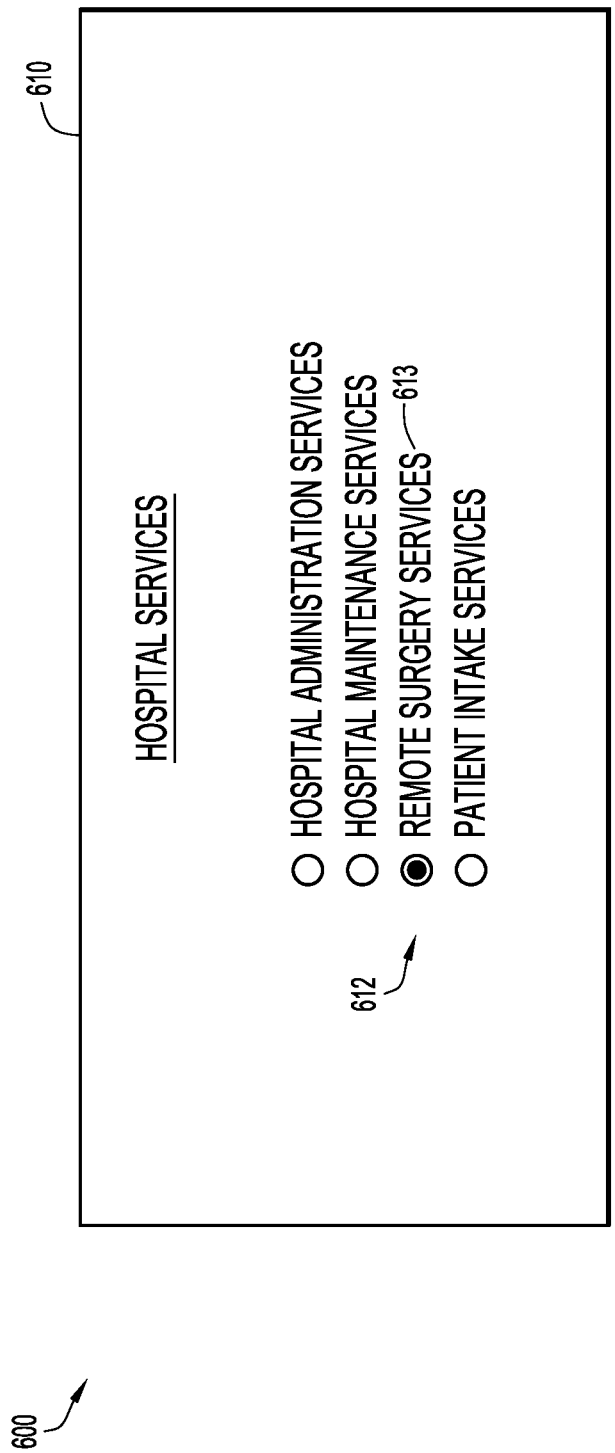

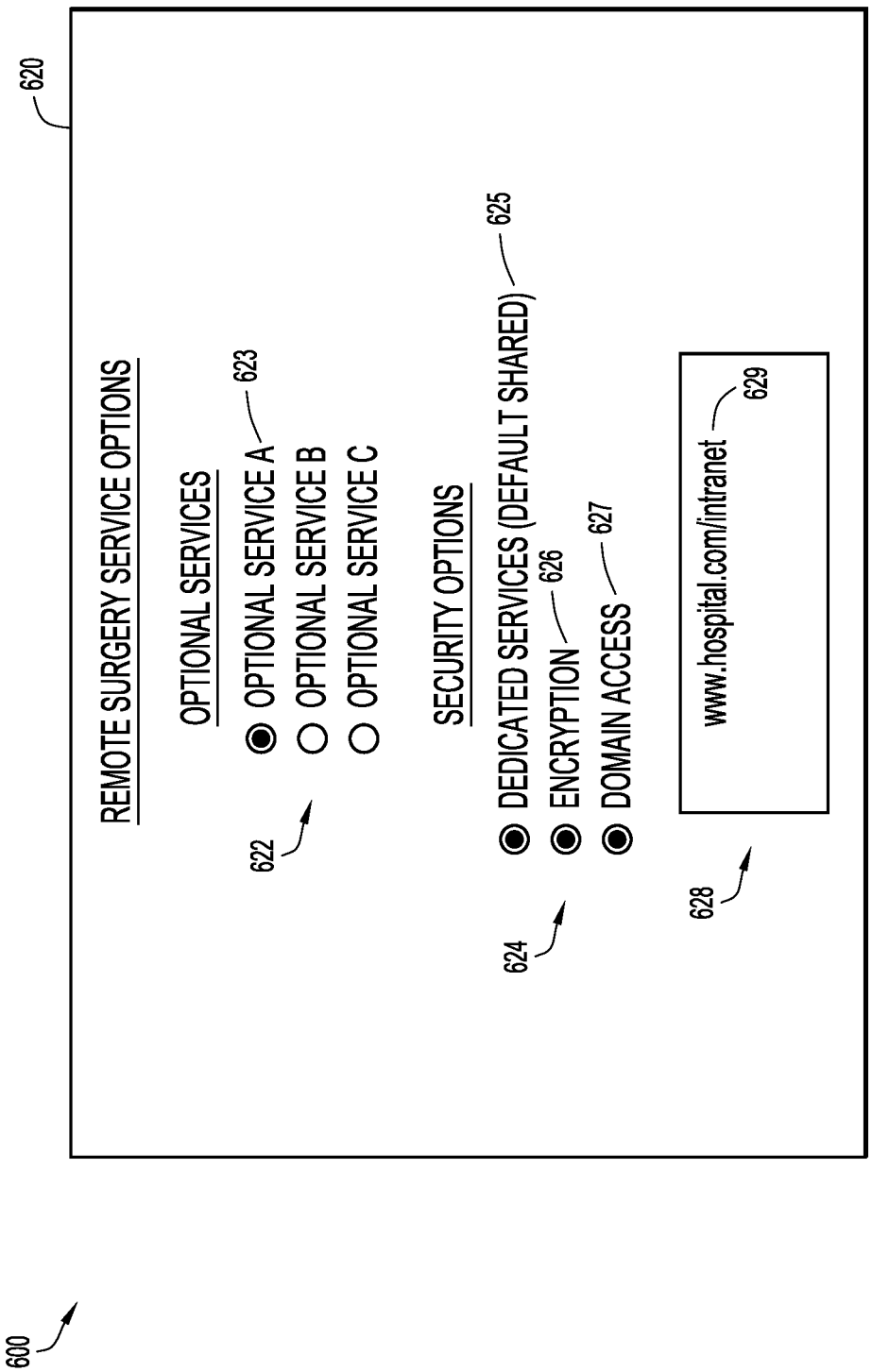

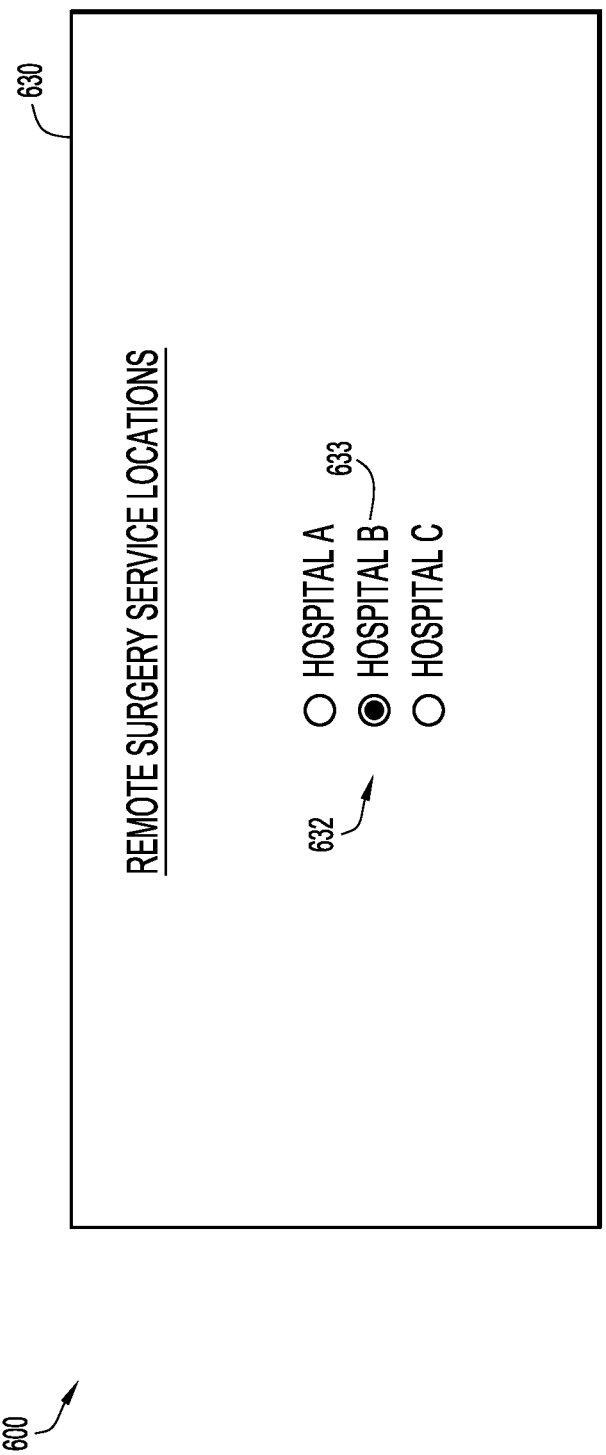

ENTERPRISE SLICE MANAGEMENT

TECHNICAL FIELD

The present disclosure relates to a communication system, in particular, to enterprise slice management.

BACKGROUND

Mobile networking architectures have grown increasingly complex in communication environments, particularly in mobile wireless environments. In some cases, mobile network architectures can be implemented using Software Defined Network (SDN) techniques to provide virtualized network architectures. As the number of mobile subscribers increases and as virtualized network architectures become more prevalent, efficient management of communication resources becomes more critical. Accordingly, there are significant challenges in managing virtualized network architectures.

BRIEF DESCRIPTION OF THE DRAWINGS

FIGS. 6A-6E are illustrative representations of example parameter input fields that may be associated with an enterprise service template, according to example embodiments.

DESCRIPTION OF EXAMPLE EMBODIMENTS

Overview

Figure 1:
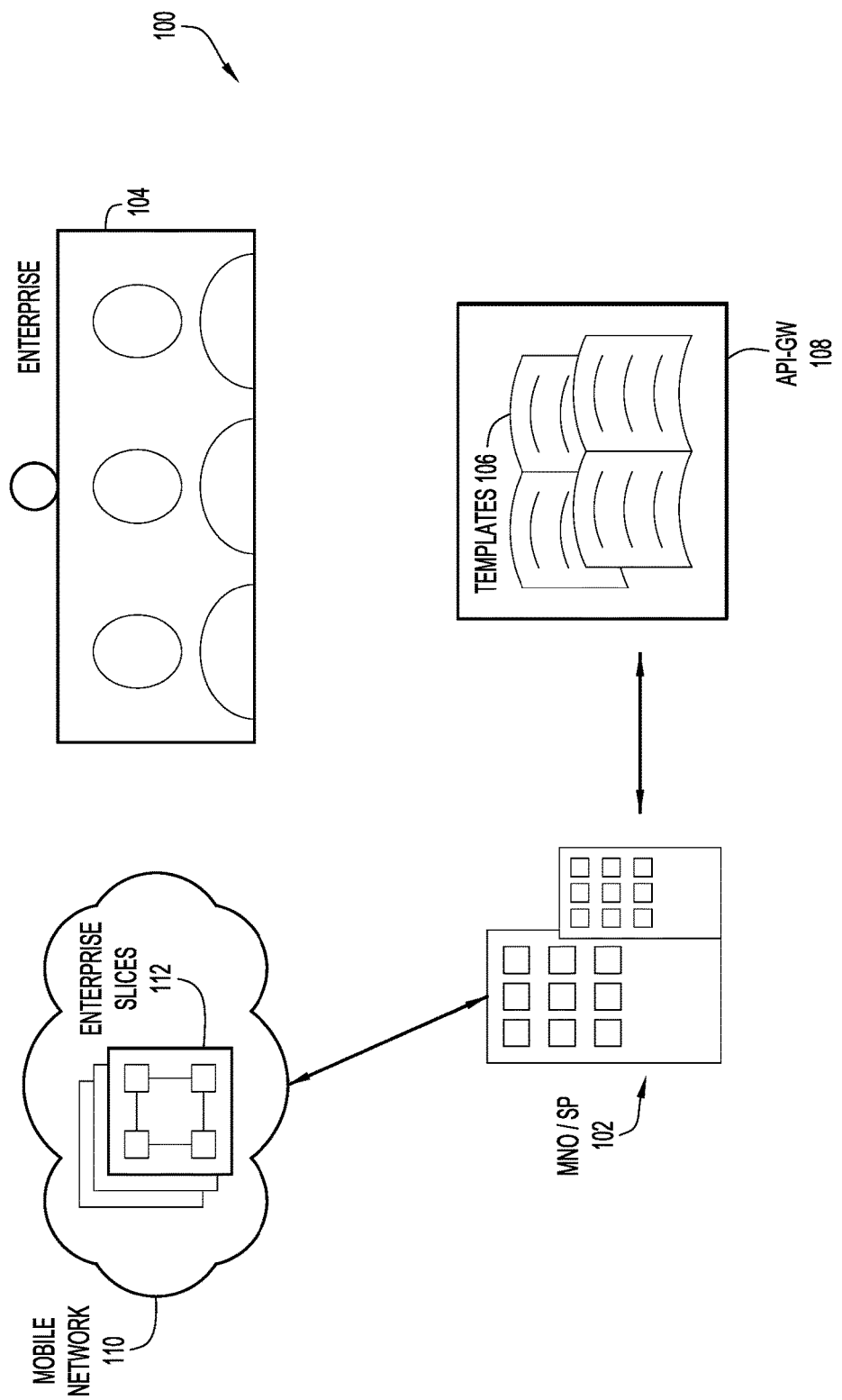
FIG. 1 is a conceptual illustration of a system that includes a mobile network operator/service provider (MNO/SP) and an enterprise or enterprise network.

Presented herein are techniques to provide enterprise slice management. A computer-implemented method is provided in one example embodiment and may include providing an enterprise service template to an enterprise, the enterprise service template comprising parameter input fields for indicating enterprise devices associated with the enterprise, services to be provided to the enterprise devices using a mobile network, and service options associated with the services; determining, responsive to service template inputs to the parameter input fields, one or more mobile network services to be provided to a plurality of enterprise devices and one or more service options associated with the one or more mobile network services; identifying, based on the one or more mobile network services, an enterprise slice to provide the one or more mobile network services; and provisioning the enterprise slice based on the one or more mobile network services, the plurality of enterprise devices, and the one or more service options associated with the one or more mobile network services.

Providing the enterprise service template may include providing the enterprise service template to the enterprise using an application programming interface (API) gateway of the mobile network. The API gateway may identify the enterprise slice based on the one or more mobile network services to be provided to the plurality of enterprise devices in which the identifying may further include communicating, from the API gateway to a slice manager of the mobile network, an identification of the enterprise slice, wherein the identification of the enterprise slice indicates an enterprise slice type.

In at least one embodiment, the method may further include determining, by the slice manager, whether an existing enterprise slice is available to provide the one or more mobile network services to the plurality of enterprise devices. In at least one embodiment, based on a determination that an existing enterprise slice is available to provide the one or more mobile network services to the plurality of enterprise devices, the provisioning may be performed for a plurality of virtualized network functions of the existing enterprise slice. In at least one embodiment, based on a determination that no existing enterprise slice is available to provide the one or more mobile network services to the plurality of enterprise devices, the method may further include instantiating a new enterprise slice comprising a plurality of virtualized network functions, wherein the provisioning is performed for the plurality of virtualized network functions of the new enterprise slice.

In at least one embodiment, determining, by the slice manager, whether an existing enterprise slice is available to provide the mobile network services to the plurality of enterprise devices may include determining whether the plurality of virtualized network functions have capacity to meet expected demand for the one or more mobile network services to be provided to the plurality of enterprise devices.

In at least one embodiment, the enterprise service template may further include parameter input fields for identifying a plurality of assurance data types, wherein the assurance data types are associated with the one or more mobile network services to be provided to one or more of the plurality of enterprise devices. In various embodiments, the one or more service options may include one or more of policies associated with the services to be provided to the enterprise devices; a geographic location associated with the services to be provided to the enterprise devices; and security options associated with the services to be provided to the enterprise devices.

Example Embodiments

For purposes of understanding certain embodiments of systems and architectures disclosed herein, it is important to appreciate the technologies and data that may be associated with network communications for 3rd Generation Partnership Project (3GPP) Long Term Evolution (LTE) Evolved Packet Core (EPC) mobile network architectures, sometimes referred to as 4th Generation (4G)/LTE architectures, as well as 3GPP 5th Generation (5G) mobile network architectures. The following foundational information may be viewed as a basis from which the present disclosure may be properly explained.

Architectures that facilitate network communications generally rely upon three basic components: a data or user plane, a control plane, and a management plane. Typically, the user plane carries data traffic (e.g., user data traffic), while the control plane and the management plane serve the data plane. As referred to herein and in the claims, the term 'plane' can refer to a separation of traffic, operations, etc. for a network and/or network element or node.

Compute node(s) having hardware, software, and/or networking resources that can be abstracted into one or more logical layers can be used to facilitate building and deploying Software Defined Network (SDN) architectures for virtualized network environments. Generally, SDN architectures provide an approach to building and deploying computer networks, networking equipment, and software that separates and abstracts the control plane and user plane of networking systems. SDN decouples the control plane that makes decisions about where traffic is sent from the underlying user plane that forwards traffic to a selected destination. SDN allows network administrators, operators, etc. to manage network services through abstraction of lower level functionality into a virtualized network environment. In various embodiments, a compute node can include, but not be limited to: a data center compute node such as a server, rack of servers, multiple racks of servers, etc. for a data center; a cloud compute node, which can be distributed across one or more data centers; among others.

As referred to herein in this disclosure, the terms 'virtual machine', 'virtualized network function', 'virtualized network functionality', 'virtualized network architecture', and variations thereof can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, element, module, aggregator, combinations thereof or the like as described herein may execute (e.g., be instantiated to perform one or more operation(s)) via a hypervisor-based virtualization or a container-based virtualization of one or more compute node(s) using the compute node(s)' hardware (e.g., processor, memory, network interfaces, etc.), software and/or operating system for a given virtualized network environment.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual, or script data or information or any type of source or object code, or any other suitable data or information in any appropriate format that can be communicated from one point to another using electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. As referred to herein and in the claims, the terms 'packet' and 'data packet' may be used interchangeably. Within a network architecture or environment, Internet Protocol (IP) addresses for any element in the network environment can be assigned using Dynamic Host Configuration Protocol (DHCP), Stateless Address Auto-configuration (SLAAC), during default bearer activation processes, etc., or any suitable variation thereof. IP addresses discussed herein and in the claims can include IP version 4 (IPv4) and/or IP version 6 (IPv6) addresses.

In traditional 3GPP 4G mobile network architectures, user equipment (UE) devices typically connect to a service provider mobile packet core (e.g., 4G EPC) network through over-the-air communications with one or more radio nodes such as evolved Node Bs (eNodeBs or eNBs) for a 3GPP Radio Access Network (RAN), which interface with control plane elements such as Mobility Management Entities (MMES) and user plane elements such as Serving Gateways (SGWs) and Packet Data Network (PDN) Gateways (PGWs). Policy and charging elements, such as Policy and Charging Rules Functions (PCRFs) may also be provided.

In traditional 3GPP 4G mobile network architectures, user plane elements such as SGWs can route and forward user data packets while also acting as a mobility anchor for inter-3GPP mobility (e.g., handling mobility interfacing to other networks such as 2nd Generation (2G) and/or 3rd Generation (3G) networks) and during inter-eNodeB handoffs or handovers. Further, PGWs may provide UE connectivity to external PDNs, such as the Internet, an IP Multimedia Subsystem (IMS), combinations thereof, or the like. A PGW can serve as a policy enforcement point to manage Quality of Service (QoS), flow classification, online/offline flow-based charging, data generation, shallow packet inspection, deep packet inspection (DPI), packet filtration, intercept, combinations thereof or the like. Control plane elements such as MMES can provide tracking area list management, idle mode UE tracking, bearer activation and deactivation, SGW and PGW selection for user equipment sessions, authentication services, etc. PCRFs can support the creation/installation/etc. of policy and charging control (PCC) rules and make policy and/or charging decisions for each of a respective subscriber associated with each of a respective user equipment session for various elements data plane elements.

SDN concepts can be applied to a traditional 3GPP 4G architecture to enable separation of the control and user planes in order to implement a Control and User Plane Separation (CUPS) architecture in which the control and user paths are split across the two planes thereby creating a control plane (CP) implemented via one or more controller element(s) and a user plane (UP) implemented via one or more forwarding element(s) (FE(s)). For a 3GPP 4G CUPS architecture, control plane VNFs can include any number of MMEs, control plane SGWs (referred to herein as SGW-Cs), and control plane PGWs (referred to herein as PGW-Cs) that manipulate the user plane network infrastructure to facilitate end-to-end service provider network connectivity. Also for a 3GPP 4G CUPS architecture, the user plane (UP) FE(s) (e.g., VNFs) can include any number of user plane SGWs (referred to herein as SGW-Us) and user plane PGWs (referred to herein as PGW-Us) that can process and perform operations on subscriber (e.g., UE) traffic as the traffic passes through the service provider network. In some embodiments, functionality for the SGWs and PGWs can be combined to provide a System Architecture Evolution Gateways (SAEGWs), which can be implemented in a CUPS architecture as control plane SAEGWs (referred to herein as SAEGW-Cs) and user plane SAEGWs (referred to herein as SAEGW-Us). Together, the control plane and user plane elements can manage the forwarding of all subscriber traffic through a service provider network.

SDN concepts also provide a foundation upon which 3GPP 5G mobile network architectures may be implemented. Various VNFs that may be provided for a 5G mobile network architecture may include control plane elements such as an Access and Mobility Function (AMF) and a Session Management Function (SMF), and user plane elements such as User Plane Functions (UPFs). Generally, the AMF provides authentication, authorization, and mobility management for mobile devices, while the SMF is generally responsible for session management with individual functions being supported on a per-session basis in which the SMF allocates IP addresses to mobile devices, and selects and controls the UPFs for data transfer. The SMF also acts as the external point for all communication related to the various services offered and enabled in the user plane and how the policy and charging treatment for these services is applied and controlled. Other control plane elements may be implemented. The UPFs may operate as Virtualized Network Functions (VNFs) to serve as forwarding engines for user traffic and may perform a variety of functions such as shallow packet inspection, DPI, traffic optimization and inline services such as Network Address Translation (NAT)/Firewall/Domain Name System (DNS) snooping, QoS, among others.

In some cases, VNFs can be grouped or otherwise organized as slices in which a slice (e.g., group of VNFs) of a certain slice type may provide one or more mobile network services. Different types of slices may be configured for a mobile network to provide different services. To provide mobile network services associated with a given slice type, a slice of the given type may be instantiated in which the instantiated slice may provide mobile network services to a number of mobile devices.

3GPP standards prescribe 3GPP slice management templates, which focus on the characteristics of a slice to be managed in terms familiar to a mobile network operator (MNO) and/or service provider (SP) (collectively 'MNO/SP'), such as packet size, radio spectrum, among others. These terms, while useful from the perspective of a MNO/SP for managing slices, may be of little use to an enterprise customer desiring to contract mobile network services from an SP. Rather, enterprises typically wish to request functionality or services from an SP in order to extend their enterprise network into the SP mobile network in which the definition of this extension maps into one or more enterprise slices that satisfy use-cases described in terms well understood by an enterprise.

By 'well understood', it is meant that information may be provided to an enterprise in an 'enterprise readable' form such that an enterprise may understand the services, scope of a service, affected users/devices of services, assurance data of services, etc. that may be provided to the enterprise by a MNO/SP.

Example embodiments described herein provide techniques to overcome these hurdles by providing a mechanism to link the intent of an enterprise with the slice management capabilities of a MNO/SP.

Referring to FIG. 1, FIG. 1 is a conceptual illustration of a system 100 that includes a MNO/SP 102, an enterprise 104 (e.g., an enterprise network), enterprise service templates 106, an application programming interface (API) gateway (API-GW) 108, and a mobile network 110 including enterprise slices 112. MNO/SP 102 and enterprise 104 may have a business agreement for contracted services.

MNO/SP 102 business organization may create enterprise service templates 106 representing contracted enterprise services or, more generally, services that MNO/SP 102 may provide to enterprise 104 via one or more enterprise slices 112 of mobile network 110.

Enterprise service templates 106 are defined by the MNO/SP 102 that represent an enterprise view (e.g., a presentation view that is in an enterprise readable form such that enterprise service templates 106 incorporate terms, features, services, service options, device/user names, device/user identities, policies, etc. that may be well understood by the enterprise 104) of the MNO/SP mobile network 110 services/features that will satisfy one or more enterprise 104 use-cases.

Consider, for example, an enterprise such as a hospital enterprise in which enterprise service templates 106 may incorporate various parameter input fields for selecting network services/features associated with use-cases described and/or presented (e.g., via a graphical user interface) in terms well understood by the hospital enterprise such as, for example: video/remote surgery services, which may involve certain types of Internet of Things (IoT) devices and/or mobile devices, certain identities associated with certain devices (e.g., doctors, nurses, etc.), and service options associated therewith (e.g., policies, data caps/throughput, security, geographic location information, etc.); patient intake services, which may involve other types of devices, identities, and service options; hospital maintenance services, which may involve still other types devices, identities, and service options; hospital administration services, which may involve still other types of devices, identities, and service options; and so on.

Thus, enterprise service templates 106 may represent a set of network capabilities that provide an abstracted view of the mobile network services/features that may be provided via one or more enterprise slices 112 of mobile network 110. In various embodiments, mobile network services and service options (e.g., features, etc.) that may be provided via one or more enterprise slices of a mobile network may include, but not be limited to: standards-defined services/ service options (e.g., based on 3GPP standards, Internet Engineering Task Force (IETF) standards, European Telecommunications Standards Institute (ETSI) standards, etc.), MNO/SP services/service options (e.g., for over-the-top (OTT) services, value-added services, etc. provided by an MNO/SP, third-party services/service options (e.g., OTT services, value-added services, etc. that may be provided by a third-party applications/services), assurance data services/service options (e.g., to provide assurance data to an enterprise for one or more Service Level Agreements (SLAs) associated with one or more contracted services), combinations thereof, and/or any other standards-defined and/or non-standards defined services/service options that may be provided via a mobile network.

The enterprise service templates 106 may be delivered/deployed to or otherwise configured for API-GW 108 and may include information (e.g. slice type identification, etc.) associated with the slice (or slices) that may be used to provide one or more mobile network services associated with each enterprise service template 106 and services/service options presented therein, as may be contracted by enterprise 104.

Figure 2:
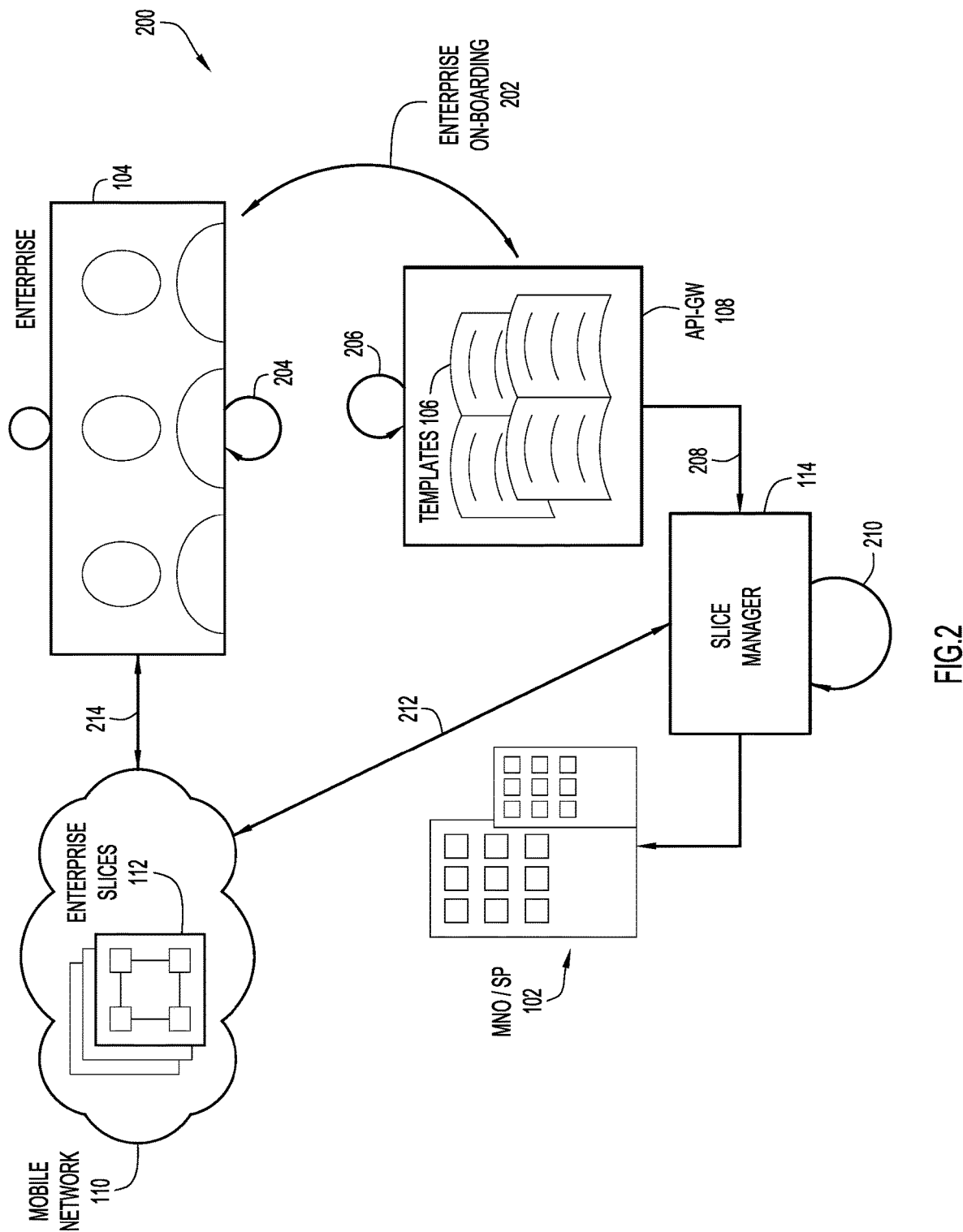
FIG. 2 is a conceptual illustration of a system and example operations to facilitate enterprise slice management, according to an example embodiment.

Referring to FIG. 2, FIG. 2 is a conceptual illustration of a system and example operations 200 to facilitate enterprise slice management, according to an example embodiment. FIG. 2 includes MNO/SP 102 that may offer mobile network services of mobile network 110 to enterprise 104 using one or more enterprise service templates 106 exposed to enterprise 104 via API-GW 108, according to an example embodiment. A slice manager 114 associated with MNO/SP 102 and enterprise slices 112 are also illustrated in FIG. 2.

In the translation from the enterprise 104 perspective to the MNO/SP 102 implementation, the MNO/SP 102 may determine whether slice management approaches are applicable to enterprise services requested by enterprise 104. For example, a determination may be made as to whether there is a suitable enterprise slice available to meet the requested parameters (e.g., services/service options) for an enterprise service template 106 and, if so, what additional provisioning and assurance data may be needed and/or whether the slice has capacity now or in the near future to meet the expected demand or can capacity of the slice be scaled to meet the demand. Assurance data may include Key Performance Indicators (KPIs) (e.g., throughput statistics, service accessibility statistics, latency statistics, etc.) that may be presented to enterprise 104 in an enterprise readable/useful form.

If there is no slice (or type of slice) available to meet the requested parameters, a network slice management function such as slice manager 114 may be requested to prepare, commission, validate, and operate an appropriate slice or type of slice satisfying a service level agreement (SLA) and use-case defined by various enterprise service template 106 parameters requested by enterprise 104 (e.g., via one or more parameter input fields of the templates). The SLA and use-case defined by enterprise service template 106 parameters requested by enterprise 104 may be contracted capabilities (e.g., network services) that form the basis of a service contract.

The type of translation from requested enterprise service template 106 parameters (e.g., services, service options, and enterprise device (member) identities) to an enterprise slice 112 configuration will depend on the specific use-case. Various translation examples may include, but not be limited to:

Full and explicit segmentation of network traffic and subscriber state: for example, an enterprise may request a security level via one or more enterprise service template parameter input fields that may translate to a specific and separate enterprise slice to maintain security;

Assurance of latency to an enterprise location: for example, an enterprise may request services for a particular enterprise location via one or more enterprise service template parameter input fields associated with different enterprise locations that may translate to an enterprise slice being deployed in a specific geographic region and/or having a specific network interconnect (e.g., public cloud) with features to monitor, report, and maintain latency;

High volume micro machine connectivity with location tracking: for example, an enterprise may request services via one or more enterprise service template parameter input fields that may translate to an enterprise slice having capabilities to low data, high device capacity IoT, and non-IP data traffic; and/or Availability and resiliency: for example, an enterprise may request, via one or more enterprise service template parameter input fields, service availability and resiliency that may translate to an enterprise slice that has availability and resiliency for 5 nines (e.g., 99.999%), 7 nines, or no loss of state, etc. and/or no/low planned maintenance.

In some embodiments, the template-driven actions can occur prior to the enterprise 104 being on-boarded to the MNO/SP 102; however, in other embodiments, the template-driven actions can occur as a result of authorized on-boarding.

Consider an example in which enterprise 104 may be on-boarded (202) to API-GW 108 in which one or more enterprise service templates 106 may be activated for exposure to enterprise 104. Enterprise 104 may request (204) via the enterprise service templates 106 enterprise services, assurances for the services, format for delivery of the assurances, etc. that are to be provided for devices of enterprise 104 via mobile network 110. The enterprise 104 requests (204) may be made via inputs to parameter input fields of enterprise service templates 106 (e.g., made via a graphical user interface (GUI)). The requests may also identify devices, users, etc. for which certain services, etc. are to be provided. Based on the requests, API-GW 108 determines (206) an enterprise slice 112 type say, enterprise slice 'X' for this example, to provide the services to enterprise 104 devices and may request (208) slice 'X' from slice manager 114.

At 210, slice manager 114 determines whether an instance of slice 'X' is available to service enterprise 104 devices. Based on a determination that no instance of slice 'X' is available to service enterprise 104 devices, slice manager 114 may instantiate or extend, also at 210, an instance of slice 'X' to provide the contracted services for enterprise 104 devices. Based on a determination that an instance of slice 'X' is available to service enterprise 104 devices or upon instantiation of an instance of slice 'X', slice manager 114 may provision (212) slice 'X' to provide the contracted services for enterprise 104 devices. Thereafter, mobile network 110 connectivity and services may be provided (214) for enterprise 104 devices. Other variations associated with determining whether an instance of a slice is available to service enterprise devices can be performed in various embodiments, as discussed in further detail herein.

Figure 3:
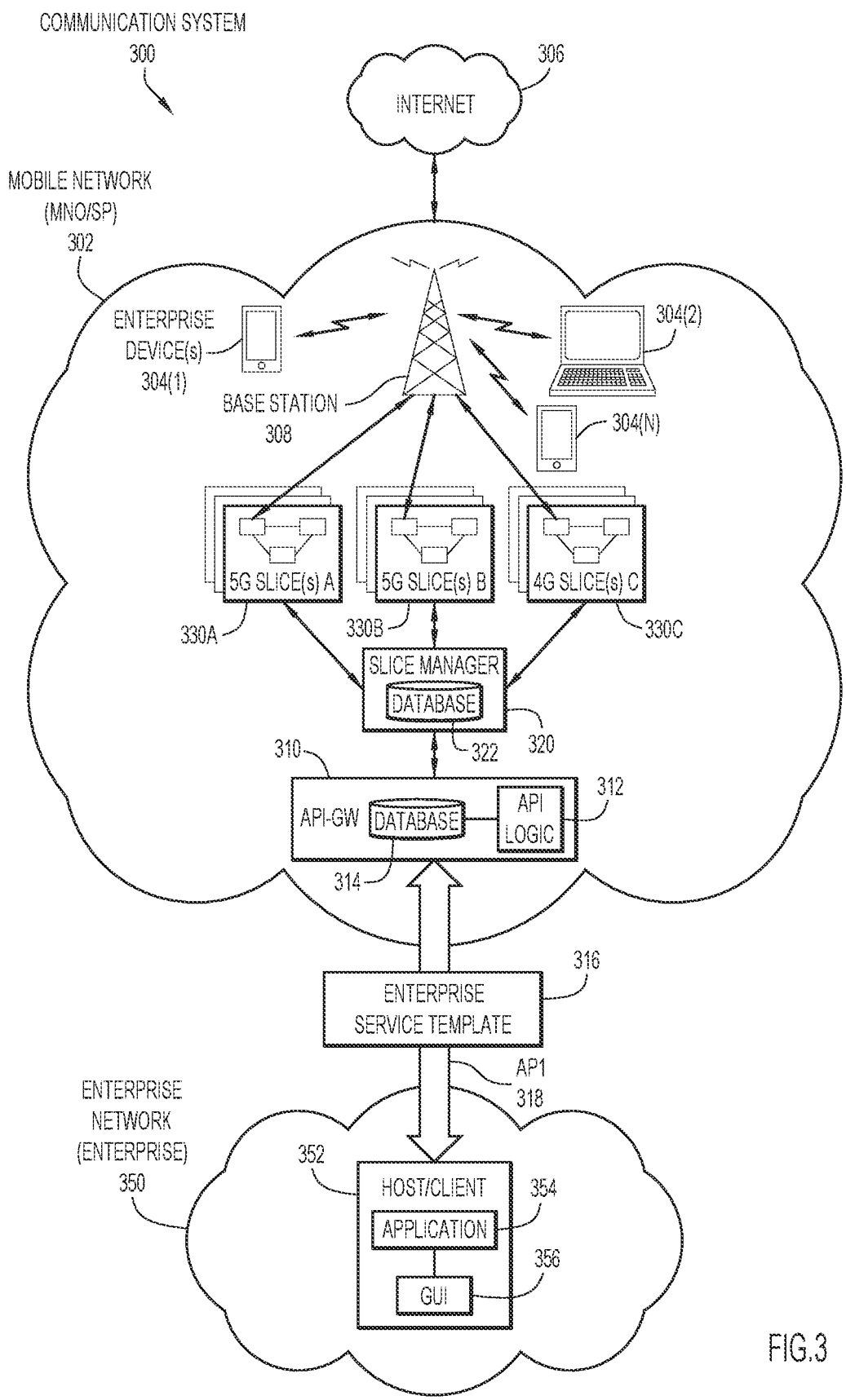
FIG. 3 is a simplified block diagram illustrating example details associated with a communication system in which techniques that provide enterprise slice management may be implemented, according to an example embodiment.
Figure 4A:
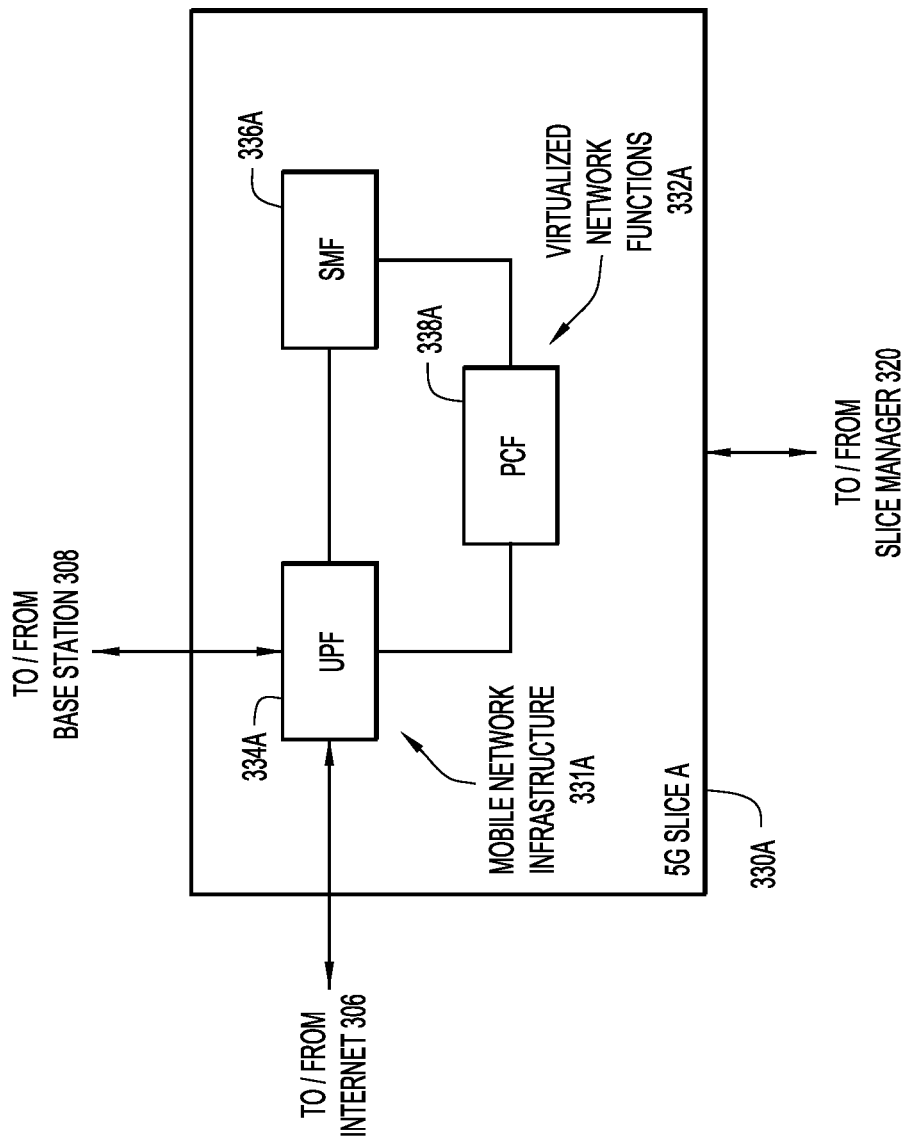
FIGS. 4A-4C are simplified block diagrams illustrating example details associated with different types of enterprise slices that may be instantiated within a mobile network of communication system of FIG. 3, according to example embodiments.
Figure 4B:
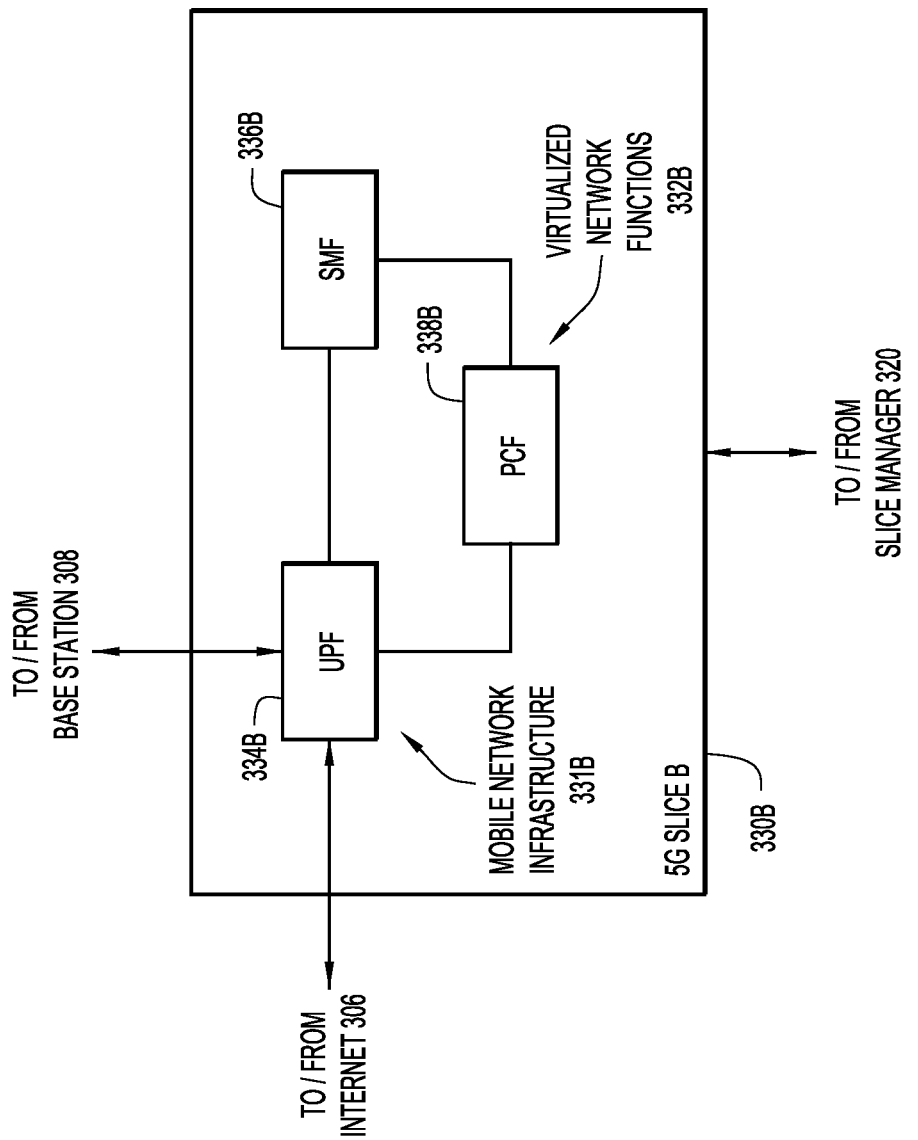
Figure 4C:
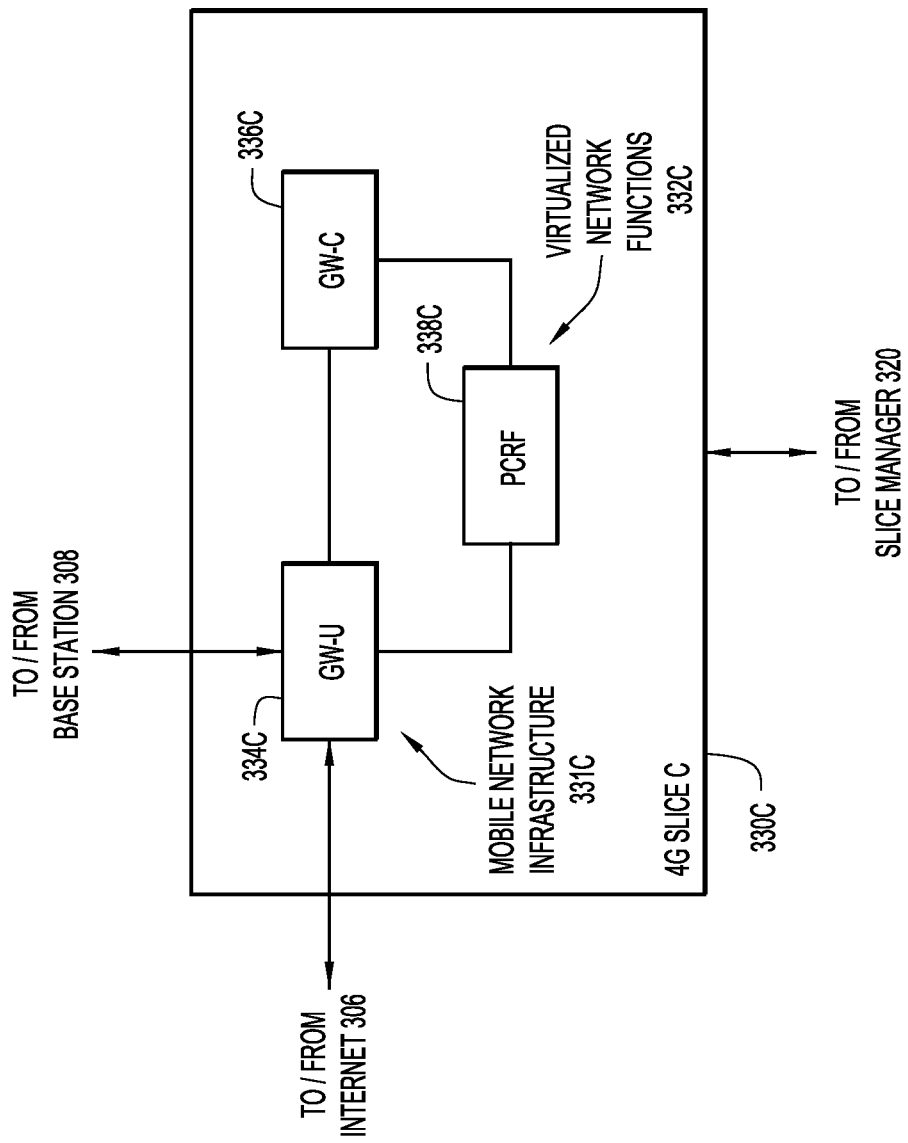

Referring to FIG. 3, FIG. 3 is a simplified block diagram illustrating example details associated with a communication system 300 in which techniques that provide for enterprise slice management may be implemented, according to an example embodiment. Referring to FIGS. 4A-4C, FIGS. 4A-4C are simplified block diagrams illustrating example details associated with different types of enterprise slices that may be instantiated within communication system 300, according to an example embodiment. As referred to herein and in the claims, the terms 'slice' and 'slice instance' may be used interchangeably to refer to an instantiation of a particular slice type.

In at least one embodiment, FIG. 3 includes a mobile network 302 associated with a MNO/SP, an enterprise network 350 associated with an enterprise, and the Internet 306. Mobile network 302 may include an API-GW 310, a slice manager 320, different types of enterprise slices 330A-330C, and base station 308 that may provide 3GPP over-the-air (e.g., Radio Frequency (RF)) service for a plurality of enterprise devices 304(1)-304(N), which may be associated with the enterprise. The different types of enterprise slices 330A-330C may provide slices of a mobile network infrastructure of mobile network 302 (discussed in further detail in FIGS. 4A-4C) to provide mobile network services to enterprise devices 304(1)-304(N). It is to be understood that any number of different types of enterprise slices may be implemented in a mobile network in accordance with embodiments herein.

Enterprise network 350 may include a host or client device 352, which may include an application 354 and a graphical user interface (GUI) 356 for interfacing with at least one enterprise service template 316 via API-GW 310 and an application programming interface (API) 318, which may provide an interface through which the enterprise can provide inputs to enterprise service template 316. In at least one embodiment, API-GW 310 may include API logic 312 and a database 314 and slice manager 320 may include a database 322. Slice manager 320 may interface with enterprise slices 330A-330C and may also interface with API-GW 310. Although only one API-GW 310 is illustrated in the embodiment of FIG. 3, it is to be understood that any number of API-GWs and/or any other network elements may be provisioned in mobile network 302 to provide various API-GW 310 features/operations discussed herein.

Mobile network 302, via API-GW 310 and API 318, may provide the at least one enterprise service template 316 for use by the enterprise to request enterprise services from the MNO/SP, which may be provided for enterprise devices 304(1)-304(N) via one or more slices 330A-330C of mobile network 302. The enterprise services may be contracted mobile network services, which are contracted based on the at least one enterprise service template 316.

In various embodiments, API logic 312 of API-GW 310 may include instructions that, when executed (e.g., by processor(s) of API-GW 310) may facilitate various operations including, but not limited to: receiving and transmitting API procedure calls, providing enterprise exposure and control over (e.g., for provisioning) mobile network services that may be provided via an enterprise slice 330A-330C for enterprise devices 304(1)-304(N) associated with the enterprise for one or more contracted mobile network services; facilitating authentication/authorization operations associated with on-boarding the enterprise (and/or other enterprises) to access/interact with one or more enterprise service templates 316; receiving inputs provided to the enterprise service template 316 via client device 352; cooperating and/or interacting with other logic (internal and/or external to API-GW 310); maintaining and/or interacting with stored data, information, parameters; combinations thereof; and/or the like to facilitate various operations as discussed for various embodiments described herein.

Client device 352 is connected in (private) enterprise network 350 and may facilitate enterprise communications with API-GW 310 using application 354, which may interface with API logic 312 via API 318. Client Device 352 may include any processor(s), memory element(s) (including logic, etc.), storage, or the like to facilitate various operations discussed herein. GUI 356 provided via client device 352 may facilitate interfacing with at least one enterprise service template 316 for requesting enterprise services/service options, identifying enterprise devices for which the services are to be provided, and requesting various assurance data types and/or presentation formats, and/or requesting changes or updates for services, service option, and/or assurance data types/presentation formations.

As referred to herein, any geographic areas, security levels/classes, policies, service levels/classes, and/or the like that may be configured for one or more mobile network services (e.g., 3GPP, non-3GPP, etc.) may be collectively referred to as 'service options' for various mobile network services.

In at least one embodiment, the API 318 may be defined at least in part by one or more API procedure calls, which may be facilitated through interactions of the enterprise with enterprise service template 316 and parameter input fields associated with enterprise service template 316 that may be provided via GUI 356 and application 354 to perform one or more operations as discussed for various embodiments described herein.

During operation, various API procedure calls may be executed via one or more network elements, nodes, devices, etc. within system (e.g., system 100, communication system 300, etc.) to perform various operations as described for embodiments herein. For example, in some instances API logic 312 may be the receiving end of an API procedure call, which may be originated by application 354 in combination with one or more inputs provided to enterprise service template 316 via GUI 356, and may result in one or more operations being performed by API-GW 310. Any order, direction, combination, etc. of API procedure calls can be envisioned to facilitate operations described herein.

In at least one embodiment, database 314 may be configured to store different enterprise service templates, which can include various parameter input fields such as selectable parameter input fields, assignable parameter input fields, and/or any other fields that may be provided in an enterprise readable format to facilitate enterprise requests for enterprise services for one or more enterprise users (e.g., enterprise devices 304(1)-304(N)). In some embodiments, database 314 may be configured to store enterprise slice type identifying indicators, which can be used by API-GW 310 to identify different types of validated enterprise slices that may be associated with different collections or groups of VNFs that may be utilized to provide various mobile network services based on the enterprise services requested by the enterprise.

Again, enterprise service template 316 may be configured with various parameter input fields such as selectable parameter input fields, assignable parameter fields and/or any other parameter input fields, which may be provided or presented in an enterprise readable format using terms well understood by the enterprise to facilitate enterprise requests for enterprise services for one or more enterprise devices/users. In at least one embodiment, selectable parameter input fields may correspond to interface features of enterprise service template 316 for which different parameters may be selected by the enterprise (e.g., via GUI 356). In at least one embodiment, assignable parameter fields may correspond to interface features of enterprise service template 316 for which parameters may be input (e.g., typed, copied, etc.) by the enterprise (e.g., via GUI 356). Different types of parameter input fields can be envisioned.

For example, in various embodiments, selectable parameter input fields may include selectable enterprise service parameter input fields associated with selectable services that may be contracted by the enterprise, selectable service option parameter input fields associated with different selectable service options for different services (e.g., for selecting/identifying geographic areas, security options/levels/etc., policies, service levels/classes, etc.), selectable assurance data parameter input fields and/or selectable assurance presentation format parameter input fields associated with selectable assurance data types and/or selectable presentation formats, selectable member identity, device type, etc. parameter input fields associated with selectable member identities (e.g., nurses, doctors, administrative staff, etc.), device types (e.g., IoT devices, smartphones, laptops, etc.), device identity, etc. for which services are to be provided, among others.

In some embodiments, assignable parameter input fields may include member identity parameter input fields for which parameters associated with enterprise device, member, group, etc. parameters may be input (e.g., typed, copied/pasted, etc.) by the enterprise. For example, assignable member identity parameter input fields may correspond to a plurality of members that are managed by the enterprise and associated with the plurality of UEs. The member identities may be, for example, member names of members (e.g. employees), member numbers, or the like.

In still some embodiments, assignable member identity parameter input fields may correspond to device identities of the plurality of UEs associated with the member identities or members. The mobile identities may be, for example, Mobile Station International Subscriber Directory Numbers (MSISDNs), International Mobile Subscriber Identities (IMSIs), IP addresses, device types (e.g., IoT devices, mobile communication devices, laptops, etc.), and/or the like.

In still some embodiments, assignable member identity parameter input fields may correspond to one or more group identities of one or more groups of member or device identities. In still some embodiments, assignable member identity parameter input fields may correspond to a plurality of member types that may be associated with one or more of: a plurality of member rank/status (e.g., bronze, gold, silver, etc.); a plurality of member departments (e.g., intake, emergency, janitorial, etc.); and/or a plurality of member locations. Other variations of selectable parameter input fields, assignable parameter input fields (e.g., service dates/times, etc.), and/or any other types of parameter input fields can be envisioned.

In various embodiments, enterprise devices 304(1)-304 (N) may be associated with any user, user equipment (UE), subscriber, employee, client, customer, electronic device, etc. wishing to initiate a flow in mobile network 302. The terms 'UE device', 'UE', 'subscriber', 'UE/subscriber', 'mobile device', 'user', and variations thereof are inclusive of enterprise devices used to initiate a communication, such as a computer, an electronic device such as a parking meter, vending machine, appliance, Internet of Things (IoT) device, etc., a personal digital assistant (PDA), a laptop or electronic notebook, a cellular telephone, an iPhone™, iPad™, a Google Droid™ phone, an IP phone, wearable electronic device or any other device, component, element, or object capable of initiating voice, audio, video, media, or data exchanges within mobile network 302. Enterprise devices 304(1)-304(N) discussed herein may also be inclusive of a suitable interface to a human user such as a microphone, a display, a keyboard, or other terminal equipment. Enterprise devices 304(1)-304(N) may also be any device that seeks to initiate a communication on behalf of another entity or element such as a program, a database, or any other component, device, element, or object capable of initiating an exchange within mobile network 302. Other variations of enterprise devices can be envisioned.

Referring to FIGS. 4A-4C, FIGS. 4A-4C are simplified block diagrams illustrating example details associated with different types of enterprise slices 330A-330C that may be instantiated within mobile network 302 of communication system 300, according to various example embodiments.

As illustrated in FIG. 4A, enterprise slice 330A be of a type '5G Slice A', which may include a mobile network infrastructure 331A including virtualized network functions (VNFs) 332A that may provide certain types of 5G mobile network services (e.g., as may be contracted by the enterprise). Here, a VNF 334A may provide certain types of 5G mobile network services associated with a UPF, a VNF 336A may provide certain types of 5G mobile network services associated with an SMF, and VNF 338A may provide certain types of 5G mobile network services associated with a 5G Policy Control Function (PCF). In some implementations, VNF 334A (UPF) may interface with base station 308 and internet 306 to provide a user plane data path between enterprise devices 304(1)-304(N) for sessions of such devices (e.g., voice calls, data transfer, multimedia streaming, etc.). VNFs 334A, 336A, and 338A may also interface with slice manager 320, which may instantiate a slice of the slice type, in some cases, and/or may provision/update service information (e.g., service types, service options, member identities, etc.) for the VNFs based on mobile network services contracted with the enterprise. Slice manager 320 may interface with VNFs 334A, 336A, and 338A for other purposes such as managing mobile network resources (e.g., hardware, software, and/or networking resources) for the enterprise slice, connectivity, gathering/collecting assurance data, among others. It is to be understood that VNFs 334A, 336A, and 338A are illustrated in FIG. 4A for illustrative purposes only and are not meant to limit the broad scope of the present disclosure. Any additional and/or other VNFs (e.g., AMFs, etc.) may be provisioned for an enterprise slice to provide any 5G mobile network services that may include standards-defined and/or non-standards defined services.

As illustrated in FIG. 4B, enterprise slice 330B be of a type '5G Slice B', which may include a mobile network infrastructure 331B including virtualized network functions (VNFs) 332B that may provide certain types of 5G mobile network services (e.g., as may be contracted by the enterprise). Here, a VNF 334B may provide certain types of 5G mobile network services associated with a UPF, a VNF 336B may provide certain types of 5G mobile network services associated with an SMF, and VNF 338B may provide certain types of 5G mobile network services associated with a PCF, which may be different than the 5G mobile network services associated with enterprise slice 330A of the type '5G Slice A'.

Interfaces among VNFs 332B, 336B, and 338B of enterprise slice 330B in relation to the internet 306 and slice manager 320 may be similar and for similar purposes as those described for enterprise slice 330A for various 5G mobile network services (e.g., standards- and/or non-standards-defined services) that may be provided via enterprise slice 330B. Further, it is to be understood that VNFs 334B, 336B, and 338B are illustrated in FIG. 4B for illustrative purposes only and are not meant to limit the broad scope of the present disclosure. Any additional and/or other VNFs (e.g., AMFs, etc.) may be provisioned for an enterprise slice to provide any 5G mobile network services that may include standards-defined and/or non-standards defined services.

As illustrated in FIG. 4C, enterprise slice 330C be of a type '4G Slice C', which may include a mobile network infrastructure 331C including virtualized network functions (VNFs) 332C that may provide certain types of 4G/LTE mobile network services (e.g., standards and/or non-standards-defined services as may be contracted by the enterprise). Here, a VNF 334C may provide certain types of 4G/LTE mobile network services associated with a user plane gateway (GW-U) (e.g., PGW-U, SGW-U, or SAEGW-U), a VNF 336C may provide certain types of 4G/LTE mobile network services associated with a control plane gateway (GW-C) (e.g., PGW-C, SGW-C, or SAEGW-C) and VNF 338CF may provide certain types of 4G/LTE mobile network services associated with a PCRF.

In some implementations, VNF 334C (GW-U) may interface with base station 308 and internet 306 to provide a user plane data path between enterprise devices 304(1)-304(N) for sessions of such devices (e.g., voice calls, data transfer, multimedia streaming, etc.). VNFs 334C, 336C, and 338C may also interface with slice manager 320, which may instantiate a slice of the slice type, in some cases, and/or may provision/update service information (e.g., service types, service options, and member identities) for the VNFs based on mobile network services contracted with the enterprise. Slice manager 320 may interface with VNFs 334C, 336C, and 338C for other purposes such as managing mobile network resources (e.g., hardware, software, and/or networking resources) for the enterprise slice, gathering/collecting assurance data, among others. It is to be understood that VNFs 334C, 336C, and 338C are illustrated in FIG. 4C for illustrative purposes only and are not meant to limit the broad scope of the present disclosure. Any additional and/or other VNFs (e.g., MMEs, etc.) may be provisioned for an enterprise slice to provide any 4G/LTE mobile network services that may include standards-defined and/or non-standards defined services.

Example details provided with reference to enterprise slices 330A-330C are provided for illustrative purposes only and are not meant to limit the broad scope of the present disclosure. Virtually any types of slices, having any number and/or combination of VNFs, may be provided in a mobile network to provide mobile network services for one or more enterprises and, thus, are clearly within the scope of the present disclosure.

In some embodiments, any of enterprise slices 330A-330C may be shared across multiple enterprises. Thus, in some embodiments, enterprise service template 316, having the same or different parameter input fields (e.g., depending on contracted services, service options, etc.), may be exposed to multiple enterprises in order to provide the same or different mobile network services to each of the multiple enterprises using a same slice type/slice instance. Accordingly, in some embodiments, VNFs within a same enterprise slice instance may be configured (e.g., provisioned) to provide mobile network services for different enterprises having different SLAs to satisfy different corresponding enterprise contracts with the MNO/SP.

Figure 5:
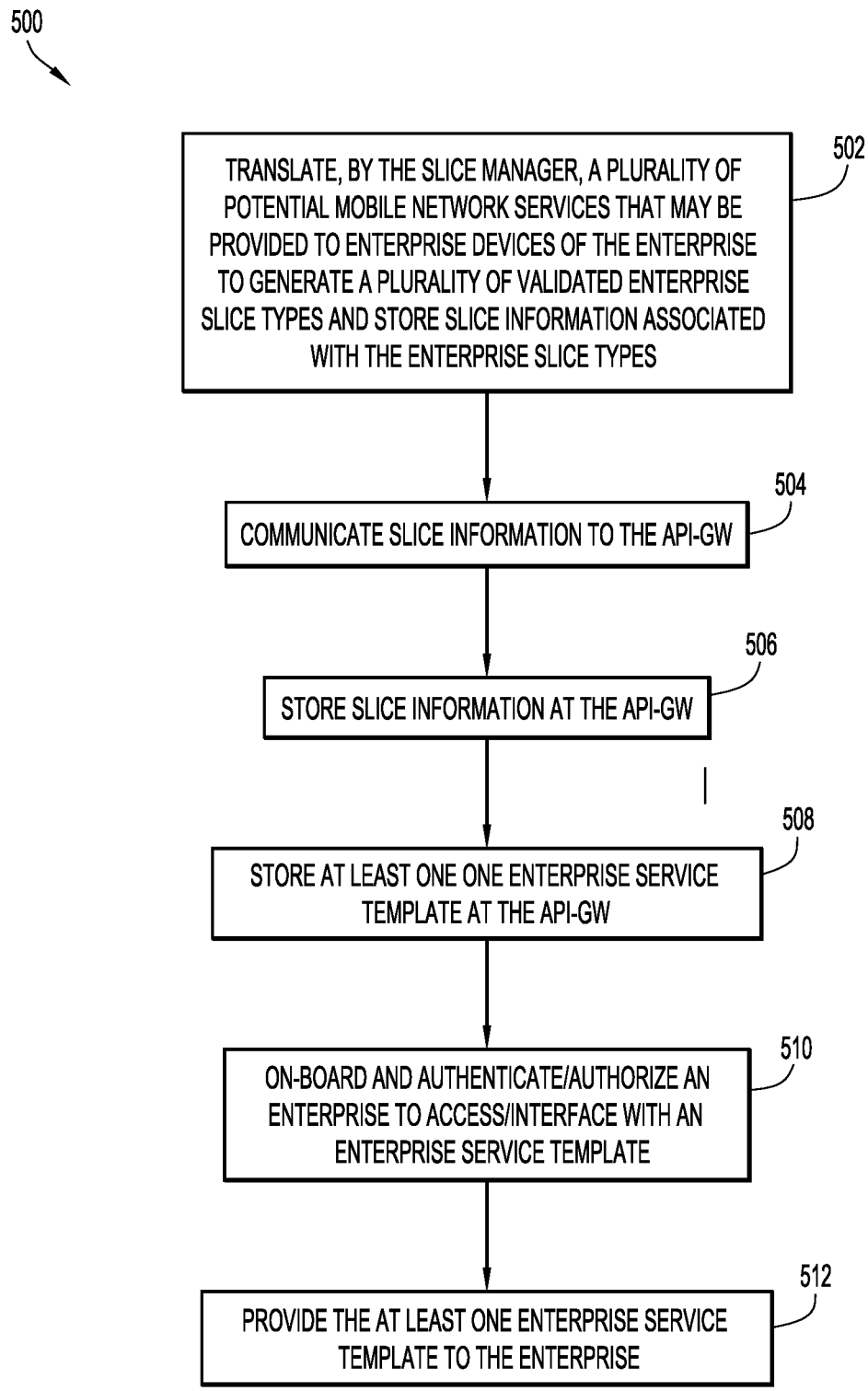
FIG. 5 is a simplified flow chart illustrating example operations associated with enterprise slice management techniques, according to an example embodiment.

Referring to FIG. 5, FIG. 5 is a simplified flow chart illustrating example operations 500 associated with enterprise slice management techniques, according to an example embodiment. In at least one embodiment, operations 500 may be performed by a slice manager (e.g., slice manager 320) and an API-GW (e.g., API-GW 310) to provide one or more enterprise service templates (e.g., at least one service template 316) for exposure to and consumption by an enterprise (e.g., the enterprise associated with enterprise network 350).

At 502, the operations may include translating, by the slice manager, a plurality of potential mobile network services that may be provided to enterprise devices of the enterprise (e.g., to enterprise devices 304(1)-304(N)) by a mobile network (e.g., mobile network 302) and/or service options (e.g., segmentation of network traffic, enterprise location, type/capacity of traffic, etc.) that may be associated with the mobile network services to generate a plurality of validated enterprise slice types. Further at 502, the slice manager may also store slice information associated with each validated enterprise slice type within a database (e.g., database 322). In various embodiments, slice information associated with each enterprise slice type may include, but not be limited to, an identifying indicator (e.g., value, name, etc.) for which each slice type may be identified, VNFs associated with each slice type, mobile network services that may be provided by each slice type, service options available for the mobile network services of each slice type assurance data that may be provided for each enterprise slice type, combinations thereof, and/or the like within the database.

In at least one embodiment, an MNO/SP can define different mobile network architectures for different types of enterprise slices that may be utilized for the mobile network to provide different mobile network services, service options, etc., different VNFs that may be utilized for each enterprise slice type, and different types of assurance data that may be available for the enterprise slice types/VNFs based on contracted or expected enterprise services that may be provided for enterprises/enterprise devices via one or more enterprise service templates. The defined information, parameters, etc. can be codified into an enterprise model that can be configured for the slice manager. In various embodiments, the enterprise model may provide for different levels of security or segmentation of network traffic and subscriber state for contracted or expected mobile network services offered to enterprises via enterprise services identified via one or more enterprise service templates, may incorporate latency assurances for contracted or expected mobile network services that may be provided enterprises/enterprise devices, may incorporate different mobile network services for different types of traffic, service options, geographic locations, member identities, etc. for contracted or expected mobile network services that may be provided for enterprises/enterprise devices, and/or may incorporate different availability and resiliency features for contracted or expected mobile network services that may be provided for enterprises/enterprise devices. Other features, services, etc. for translating enterprise service template parameters to one or more enterprise slice types can be envisioned.

In at least one embodiment, at 502, translation operations performed by the slice manager may include instantiating/utilizing the model to facilitate preparing [for example, identifying/provisioning/allocating mobile network resources, such as hardware (e.g., processors, memory elements, etc.), software (e.g., logic, etc.), and/or networking resources (e.g., networking interfaces, connections, etc.) to facilitate a mobile network infrastructure and associated VNFs for different enterprise slice types], commissioning (e.g., instantiating), and validating (e.g., testing) one or more different enterprise slice types and associated assurance data for the enterprise slice types. For example, in some implementations, the slice manager may prepare, commission, and validate a subset of all the different potential enterprise slice types based on the model, such that network/compute node resources may be available in the event that an additional enterprise slice type needs to be prepared, commissioned, and validated. Following the validation of a given validated enterprise slice type, one or more enterprise slices of the validated enterprise slice type may be instantiated and operated by slice manager, based on contracted mobile network services of an enterprise.

At 504, the operations may include the slice manager communicating at least a portion of the slice information to the API-GW. For example, the slice manager may communicate identifying indicators for each validated enterprise slice type and mobile network services associated with each enterprise slice type (e.g., the services to be provide by VNFs of the slice types) to the API-GW, in at least one embodiment. At 506, the operations may include the API-GW storing the slice information in a database (e.g., database 314).

At 508, the operations may include storing at least one enterprise service template at the API-GW for exposure and consumption by the enterprise. In at least one embodiment, the at least one enterprise service template may be a GUI-based enterprise service template including a plurality of parameter input fields for which inputs may be received from the enterprise via an application/GUI provided via a client device within the enterprise network (e.g., application 354/GUI 356 provided via client device 352) following onboarding of the enterprise. In at least one embodiment, enterprise service templates may be generated/provided by a MNO/SP and stored in the API-GW database.

The enterprise service template may present enterprise services, service options, etc. that can be requested by an enterprise for one or more enterprise devices in which the enterprise services, service options, etc. are associated (e.g., linked) with one or more mobile network services provided by VNFs of a given enterprise slice type/slice instance that can be provided via the mobile network of the MNO/SP.

At 510, the operations may include on-boarding and authenticating/authorizing (e.g., confirming credentials, etc.) the enterprise to access/interface with the at least one enterprise service template.

At 512, the operations may include providing (e.g., exposing) the enterprise service template to the enterprise in order for the enterprise to request one or more enterprise services, identify enterprise devices for which the services are to be provided (e.g., device types, member identities, group identities, etc.), and/or request/identify service options for one or more requested services (e.g., policies, geographic locations, privileges, security, etc.). In at least one embodiment, the operations at 510 may include the API-GW providing the enterprise service template to the enterprise via an API (e.g., API 318) and an application/GUI provided via the client device within the enterprise network.

Referring to FIGS. 6A-6E, FIGS. 6A-6E are illustrative representations of parameter input fields that may be associated with an example enterprise service template 600, according to example embodiments. The illustrative representations illustrated in FIGS. 6A-6E may collectively represent the example enterprise service template, in at least one embodiment. Various features associated with communication system 300 of FIG. 3 may be referenced in discussions for FIGS. 6A-6E.

FIG. 6A is an illustrative representation of enterprise service parameter input fields 610 of enterprise service template 600 associated with enterprise services that may be requested by an enterprise via an enterprise network (e.g., enterprise network 350). One or more enterprise services may be requested through interactions with one or more of the enterprise service parameter input fields 610 that may be provided for enterprise service template 600 using a GUI provided by an application of a client (e.g., GUI 356, application 354, and client device 352) within in the enterprise network that is interfacing with API logic of an API-GW of a mobile network via an API (e.g., interfacing via API 318 and API logic 312 and API-GW 310 within mobile network 302).

Figure 6D:
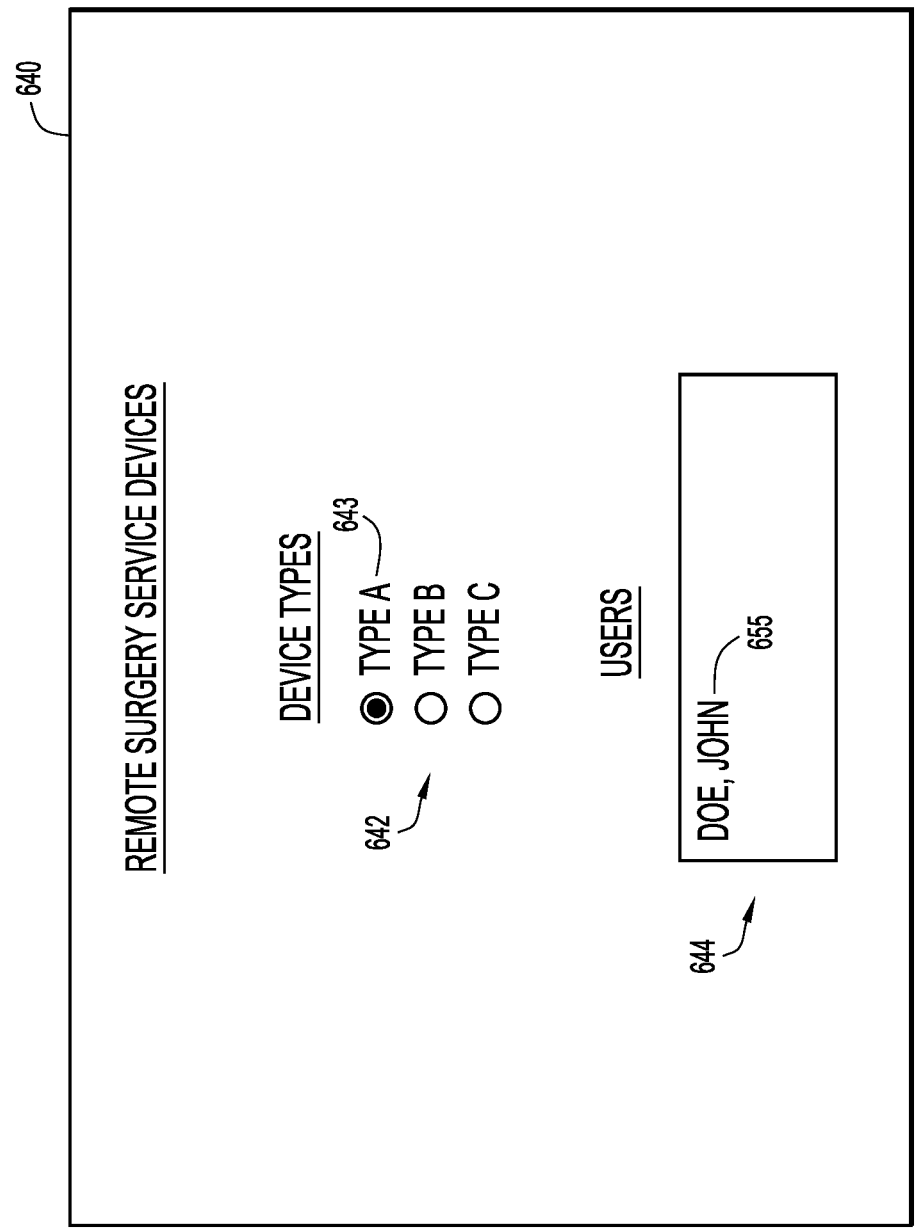

For the embodiments of FIGS. 6A-6E consider that the enterprise is a hospital enterprise. A plurality of selectable parameter input fields 612 (as viewed from the GUI of the hospital enterprise) associated with selectable enterprise services that can be requested (via inputs to the GUI) by the enterprise (e.g., contracted services) are illustrated in FIG. 6A. The enterprise services are associated with corresponding VNFs within the mobile network associated with an enterprise slice (e.g., an of enterprise slices 330A-330B that can provide mobile network services to enterprise devices (e.g., enterprise devices 304(1)-304(N) of the enterprise, based on enterprise service requests (inputs) received from the enterprise via the enterprise service template 600.

In this example, selectable parameter input fields 612 of the enterprise service template 600 may be presented to the hospital enterprise (via the GUI) using well understood terms that correspond to use-cases as may be defined by the hospital enterprise. For example, the selectable parameter input fields 612 may be associated with hospital administration services, hospital maintenance services, remote surgery services, or patient intake services, which may be associated with one or more mobile network services/service options that may be provided by the mobile network via an enterprise slice using associated VNFs of the enterprise slice. The enterprise may select one or more of the selectable parameter input fields 612, such as a selectable parameter input field 613 which, in this example, may be associated with remote surgery services.

Consider, for example, that the enterprise services/service options of the enterprise use-cases may be associated with mobile network services/service options that may be provided by an enterprise slice and may include services/service options for different Quality of Service classes, time-of-day policies, 3GPP location information (e.g., cell identities, User Location Information (ULI) types, etc.), data caps, throughput limits, segmentation/security services/classes, etc. that are typically presented in per-subscription terms, not in terms that the enterprise typically defines services/policies/etc.

In some embodiments, one or more service options may also be requested by an enterprise for one or more requested mobile network services. FIG. 6B illustrates service option parameter input fields 620 including a plurality of selectable parameter input fields 622 of the enterprise service template 600 that may be associated with optional services, such as an optional service A, an optional service B, and an optional service C, which may be associated with one or more mobile network service options applied to mobile network services and/or one or more enterprise devices for which the remote surgery service is to be provided in at least one embodiment. The enterprise may select one or more of the selectable parameter input fields 622, such as a selectable parameter input field 623 which, in this example, may be associated with optional service A.

Service option parameter input fields 620 may also include a plurality of selectable parameter input fields 624 that may be associated with security options, such as, for example, dedicated services (e.g., in which the default is shared services, encryption, and domain access). In this example, the enterprise may select one or more of the selectable parameter input fields 624, such as a selectable parameter input field 625 which, in this example, may be associated with dedicated services, a selectable input field 626, which may be associated with encryption, and a selectable parameter input field 627, which may be associated with domain access.

In some embodiments, different input parameter fields may be used in combination to receive inputs from an enterprise. For example, in at least one embodiment, an assignable parameter input field 628 may be provided for the enterprise service template 600 to receive inputs for one or more domain names that may be accessible by enterprise devices provided the remote surgery services. In this example, an input parameter 629 may be input to identify a domain (e.g., "www.hospital.com/intranet") that may be accessed by enterprise devices provided the remote surgery services.

In still some embodiments, one or more service options such as geographic locations at which mobile network services are to be provided may be requested by an enterprise. FIG. 6C illustrates mobile network service geographic location parameter input fields 630 that may be provided for enterprise service template 600 in which a plurality of selectable parameter input fields 632 that may be associated with various hospitals such as hospital A, hospital B, and hospital C that may be associated with one or more geographic locations for which an enterprise slice or slices that may provide mobile network services associated with the remote surgery services may be instantiated. As illustrated in FIG. 6C, the enterprise may select one or more of the selectable parameter input fields 632, such as selectable parameter input field 633 which, in this example, may be associated with the geographic location of hospital B.

The enterprise may further identify one or more member identities that are to be provided one or more requested enterprise services. FIG. 6D illustrates member identity parameter input fields 640 including a plurality of selectable parameter input fields 642 that may be associated with different types of devices, such as type A, type B, and type C for which the mobile network services associated with the remote surgery services may be provided, in at least one embodiment. The enterprise may select one or more of the selectable parameter input fields 642, such as selectable parameter input field 643 which, in this example, may be associated with the a device type A for which the mobile network services associated with the remote surgery services are to be provided.

In some embodiments, member identities may include users identified by name, employee number, among others. For example, member identity parameter input fields 640 shown in FIG. 6D may include an assignable parameter input field 644 in which an input parameter 645 (e.g., user/subscriber name or any other alternate user identifier) may be input to identify an enterprise device for which the mobile network services associated with the remote surgery services are to be provided.

Figure 6E:
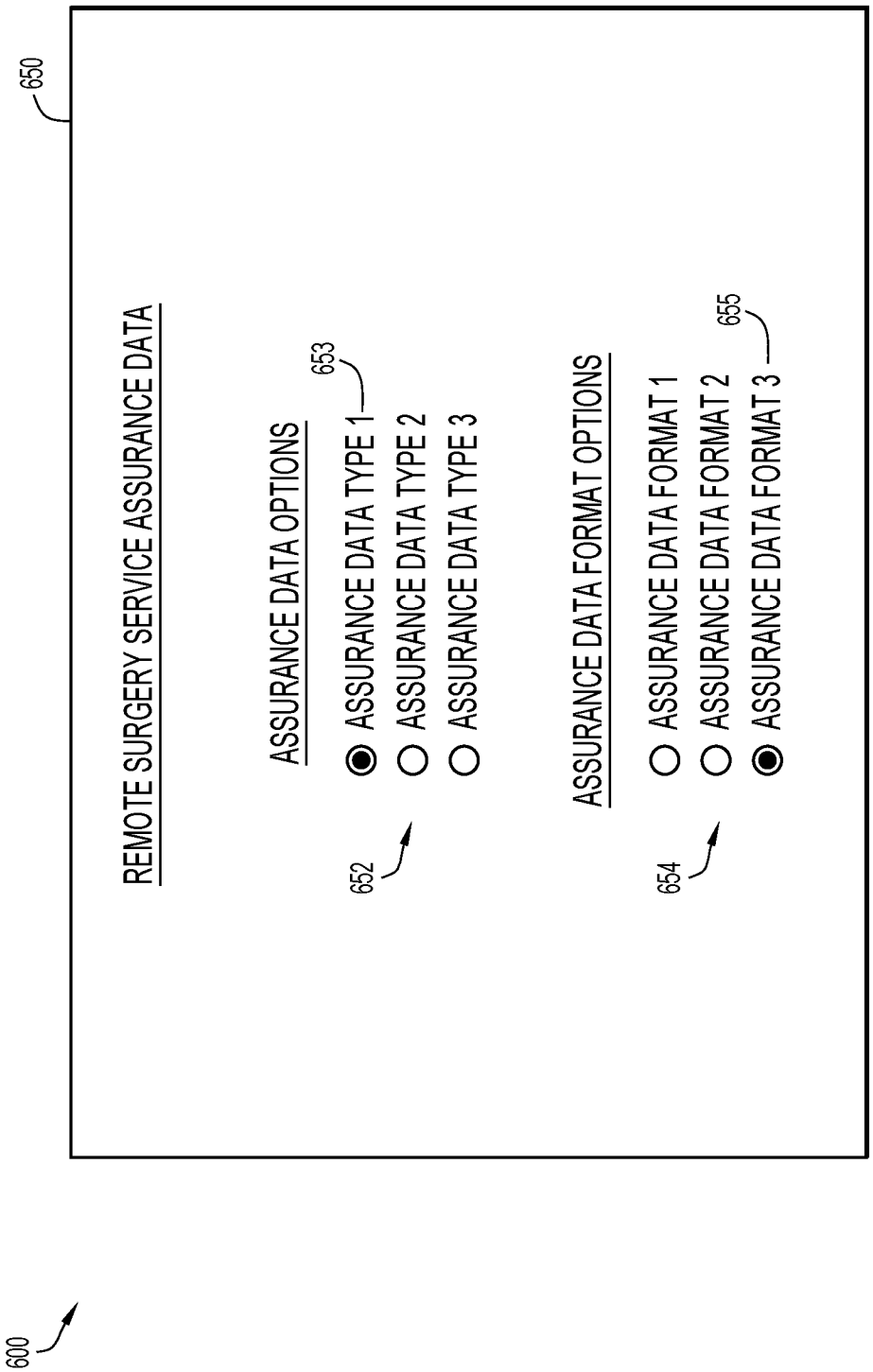

The enterprise may further request one or more types of assurance data that are to be provided for one or more requested mobile network services. FIG. 6E illustrates assurance data parameter input fields 650 including a plurality of selectable parameter input fields 652 that may be provided for enterprise service template 600 that may be associated with different types of assurance data, such as assurance data type 1, assurance data type 2, and assurance data type 3 for which the mobile network services associated with the remote surgery services may be provided, in at least one embodiment. The enterprise may select one or more of the selectable parameter input fields 652, such as selectable parameter input field 653 which, in this example, may be associated with the assurance data type 1. In various embodiments, different assurance data types may include availability and/or resiliency information, network statistics (e.g., throughput rates, dropped/rejected calls/sessions), network exceptions and/or security information (e.g., blocked sites, attempted/blocked log-ins), combinations thereof, and/or any other assurance data, KPIs, etc. that may be presented/provided to an enterprise in a format well-understood by the enterprise for their corresponding use-cases.

Assurance data parameter input fields 650 provided by enterprise service template 600 may further include a plurality of selectable parameter input fields 654 that may be associated with different format (e.g., presentation formats) for which the selected assurance data type is to be provided such as, assurance data format 1, assurance data format 2, and assurance data format 3, in at least one embodiment. The enterprise may select one or more of the selectable parameter input fields 654, such as selectable parameter input field 655 which, in this example, may be associated with the assurance data format 3. In various embodiments, different assurance data formats may include but not be limited to: streaming telemetry protocol buffers (protobufs) over a remote procedure call (RPC) framework (e.g., gRPC), Network Configuration Protocol (NETCONF), message bus publishing such as Kafka®, combinations thereof, and/or the like.

The example parameter input fields illustrated in FIGS. 6A-6E are only a few of the many types and/or combinations of parameter input fields that may be provided for an enterprise service template. Virtually any other parameter input fields may be envisioned for receiving inputs for an enterprise service template and, thus, are clearly within the scope of the present disclosure.

Following inputs provided to the enterprise service template, the template may be submitted to the API-GW, which may determine an enterprise slice type to provide the requested mobile network services to the enterprise. In various embodiments, submitting a service template to the API-GW may include, but not be limited to: a GUI submit, a commit action via the API, an API request (e.g., for requesting a slice that can serve a populated template), combinations thereof, and/or the like.

In some embodiments, the enterprise may request changes or updates to the enterprise services/service options and/or services/service options provided for one or more enterprise devices/users. In such embodiments, additional inputs or changes may be provided to the enterprise service template and submitted via the API-GW, which may cause one or more changes to an existing enterprise slice or providing a new enterprise slice to the enterprise.

Accordingly, embodiments herein provide for the ability to expose mobile network services/service options to enterprises in enterprise readable formats as enterprise services/service options using terms well-understood by enterprises thereby providing enterprises with the ability to extend their intent (e.g., desired control) into an MNO/SP mobile network in order to manage/configure enterprise slices. Typical demands that might otherwise be imposed as a result of 3GPP standards are relaxed in the template-controlled manner described by embodiments herein in order to satisfy the enterprise intent. Accordingly, the template approach allows the MNO/SP to: constrain the services offered to a subset of capabilities that have clear business Return on Investment (RoI); assess resource consumption prior to an enterprise making use of a slice-based service offering; determine the likely SLA that will be offered as a result of using that slice; present the permitted level of control, visibility and security for which an enterprise has contracted; and/or provide clear cost metrics to allow for predictable margins and accounting.

Figure 7:
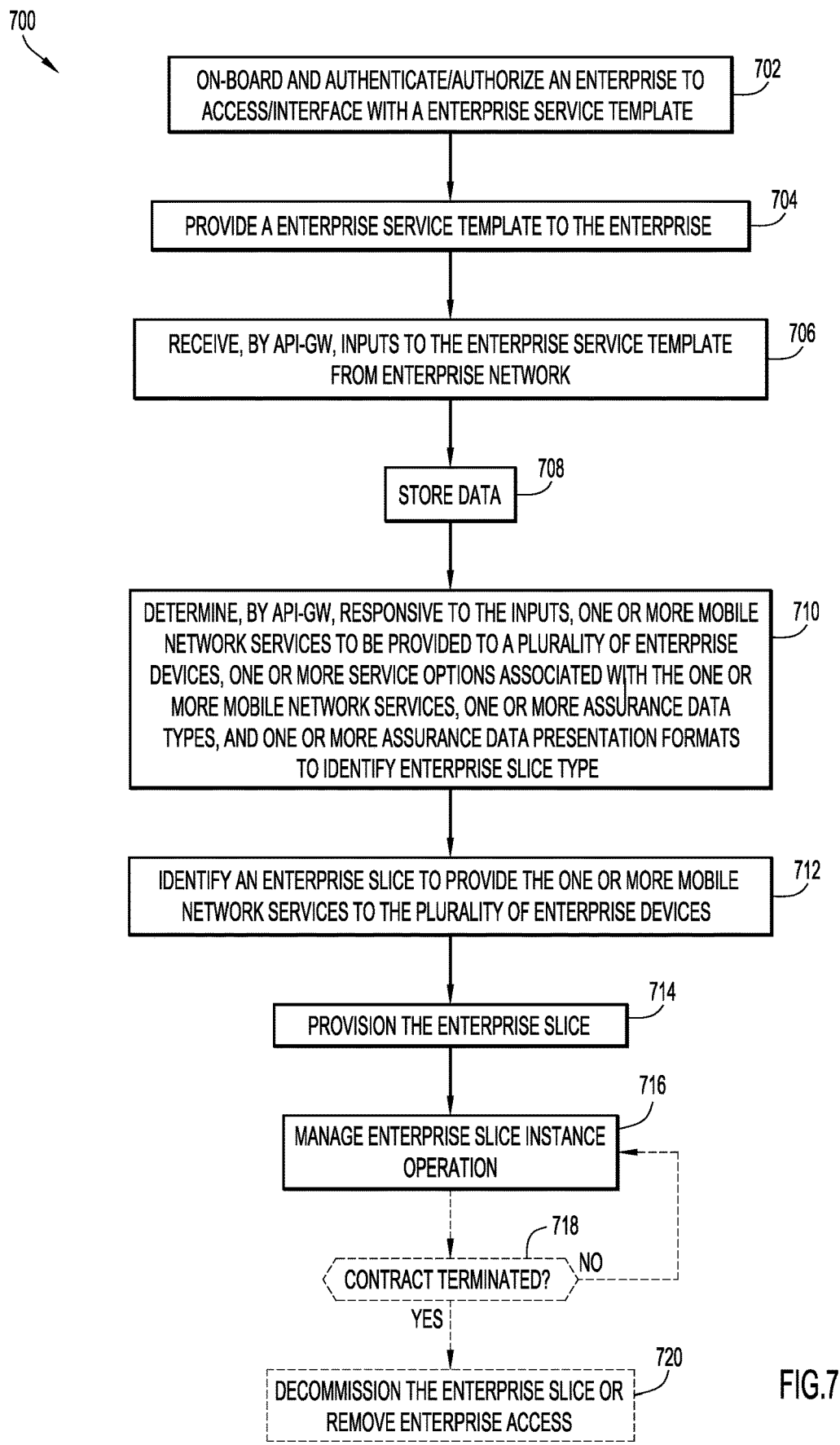
FIG. 7 is a simplified flow chart illustrating other example operations associated with enterprise slice management techniques, according to an example embodiment.

Referring to FIG. 7, FIG. 7 is a simplified flow chart illustrating other example operations 700 associated with enterprise slice management techniques, according to an example embodiment. In at least one embodiment, operations 700 may be performed by a slice manager (e.g., slice manager 320) and an API-GW (e.g., API-GW 310) to provide requested enterprise services to an enterprise (e.g., the enterprise associated with enterprise network 350) via an enterprise slice.

At 702, the operations may include on-boarding and authenticating/authorizing the enterprise to access/interface with an enterprise service template (e.g., enterprise service template 316, etc.). At 704, the operations may include providing (e.g., exposing) the enterprise service template to the enterprise in order for the enterprise to request one or more enterprise services, identify enterprise devices for which the enterprise services are to be provided (e.g., device types, member identities, group identities, etc.), request/identify service options to be applied to one or more of the enterprise devices for one or more requested enterprise services (e.g., policies, geographic locations, privileges, security, etc.), identify assurance data types that are to be provided for the enterprise services, and/or identify format(s) for providing the assurance data to the enterprise. In at least one embodiment, the operations at 704 may include the API-GW providing the enterprise service template to the enterprise via an API (e.g., API 318) and an application/GUI provided via a client device within the enterprise network.

At 706, the operations may include receiving, by the API-GW, inputs to the enterprise service template from the enterprise network. In at least one embodiment, the operations at 706 may include the API-GW, via the API logic and the API, receiving the inputs to the enterprise service template based on one or more inputs provided to one or more parameter input fields of the enterprise service template for requesting one or more enterprise services, identifying one or more member identities for which the services are to be provided, identifying one or more service options (e.g., policies, security options, geographic locations, etc.) associated with the one or more requested enterprise services, identifying one or more assurance data types that are to be provided for the requested enterprise services, and identifying one or more assurance data presentation formats. Parameters (e.g. mobile network services, service options, identities, assurance data types, and/or formats) associated with the inputs provided to the enterprise service template may be communicated from the enterprise client device to the API-GW via the API/API logic.

At 708, the operations may include storing the assurance data presentation formats at the API-GW. The presentation formats may be utilized by the API-GW to provide assurance data to the enterprise during operation of the enterprise slice. Other received parameters/data associated with the inputs may be stored by the API-GW at 708 in various embodiments.

At 710, the operations may include determining by the API-GW, responsive to the inputs (e.g., parameters received via the API), one or more mobile network services to be provided to a plurality of enterprise devices of the enterprise, one or more service options associated with the one or more mobile network services, one or more assurance data types, and one or more assurance data presentation formats to identify an enterprise slice type to provide the services/service options, etc.

In at least one embodiment, the determination at 710 may be based on mobile network services/service options, assurance data types/formats, etc. that are identified as being associated with or correlated to enterprise services/service options, assurance data types/formats, etc. presented in the enterprise service template in which the association/correlation between the mobile network services/service options, assurance data types/formats, etc. and the enterprise services/service options, assurance data types/formats, etc. presented in the enterprise service template are stored on the API-GW in order for the API-GW to determine the mobile network services/service options, assurance data types/formats, etc. based on inputs received from the enterprise and to identify an enterprise slice type (or a best match to an enterprise slice type) that can provide the one or more mobile network services/service options to the enterprise devices At 712, the operations may include identifying an enterprise slice to provide the one or more mobile network services to the plurality of identified enterprise devices. In at least one embodiment, the enterprise slice may be identified by the slice manager based, at least in part, on a slice type identified by the API-GW in which the API-GW communicates the slice type, the enterprise device identities, and the assurance data types to the slice manager. Additional operations that may be associated with the identifying at 710 and 712 are discussed in further detail herein at least at FIG. 8.

At 714, the operations may include provisioning the enterprise slice for operation to provide the mobile network services to the plurality of identified enterprise devices. In various embodiments, operations at 714 may include configuring the Access Point Name (APN) or Data Network Name (DNN) for the enterprise slice (e.g., the Internet), configuring IP connectivity for one or more VNFs of the slice, configuring access network connectivity (e.g., between the enterprise slice and one or more base stations of one or more access networks), configuring mobile network services/service options for one or more VNFs of the enterprise slice (e.g., configuring policies that may be applied/enforced for enterprise device sessions within the mobile network based on contracted services, service options, etc.), configuring connectivity between the enterprise slice and the enterprise, configuring assurance data network resources (e.g., to generate the assurance data during operation of the enterprise slice), combinations thereof, or the like for the enterprise slice.

Following the provisioning, the operations may include managing the enterprise slice operation at 716. In various embodiments, managing the enterprise slice operation may include monitoring, managing, controlling, etc. operations associated with the enterprise slice (e.g., VNFs of the enterprise slice).

In some embodiments, as shown at 718, a determination may be made by the API-GW as to whether the contract with the enterprise has terminated. In some embodiments, the determining at 718 may be based on contract dates or other contact term information associated with the enterprise contact. In still some embodiments, the determining at 718 may occur when the enterprise indicates (e.g., via the API) a specific use-case template contract is terminated, resulting in the enterprise slice no longer being required, or as a result of the enterprise no longer being an authorized user of the MNO/SP network services (e.g., based on term expiration, etc.). Based on a determination at 718 that the contract has not terminated, the operations may return to 716 and continue therefrom.

At 718, based on a determination that the contract has terminated, the operations may include decommissioning the enterprise slice or removing enterprise access to the slice at 720. In at least one embodiment, decommissioning an enterprise slice may include returning hardware, software, and/or network resources associated with the enterprise slice (e.g., VNFs associated therewith) to a pool of resources that the slice manager may utilize for instantiation of other enterprise slices. In at least one embodiment, removing enterprise access may include removing credentials authorizing access of the enterprise from the API-GW. In some embodiments, an enterprise slice may be shared across multiple enterprises; thus, decommissioning a shared enterprise slice may not be possible or may cause service interruptions. In such embodiments, access to the enterprise slice may instead be removed rather than decommissioning the slice.

Figure 8:
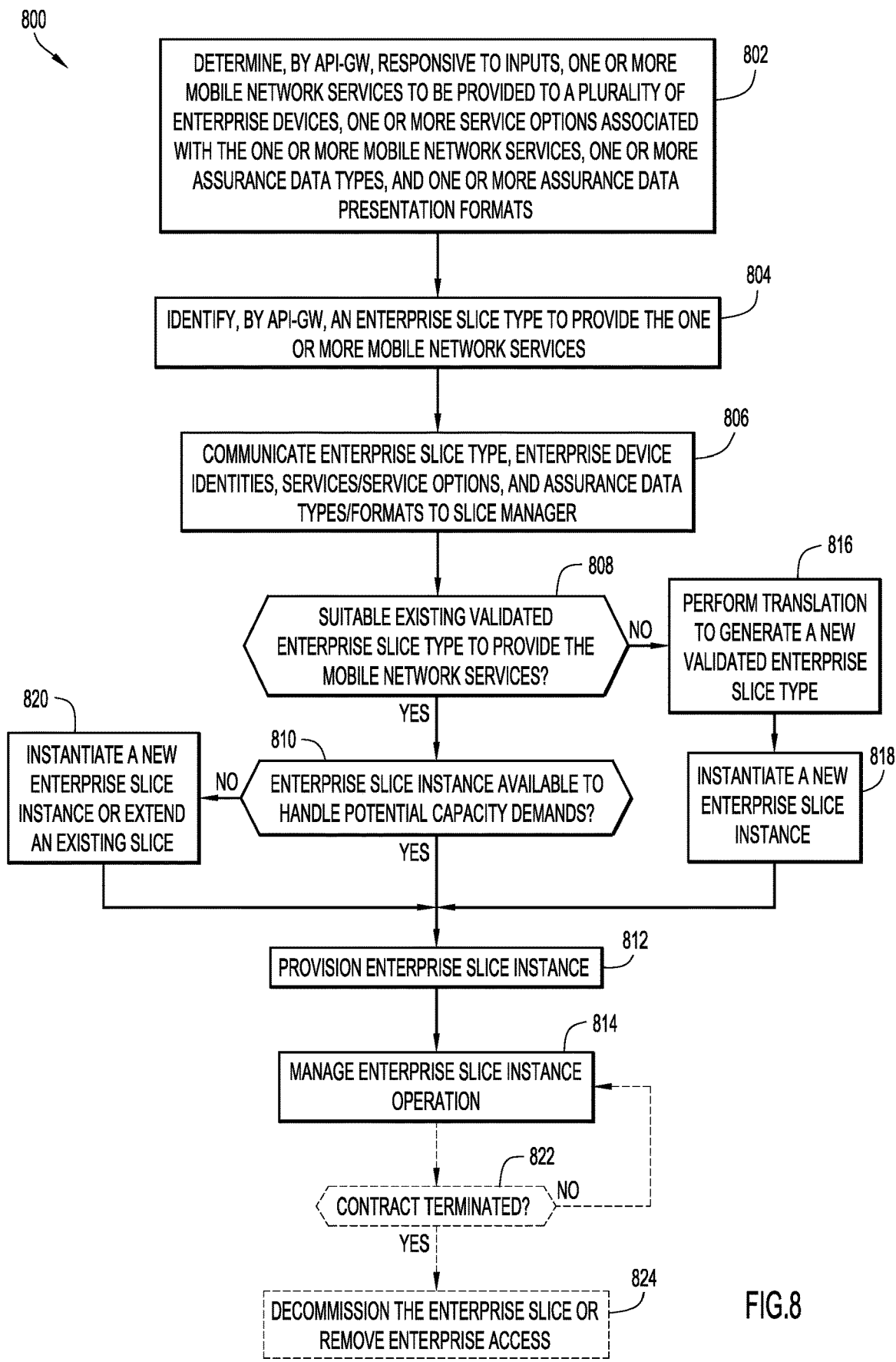
FIG. 8 is a simplified flow chart illustrating yet other example operations associated with enterprise slice management techniques, according to an example embodiment.

Referring to FIG. 8, FIG. 8 is a simplified flow chart illustrating yet other example operations 800 associated with enterprise slice management techniques, according to an example embodiment. In particular, operations 800 illustrate other example operations that may be performed to identify an enterprise slice to provide services to an enterprise. In at least one embodiment, operations 800 may be performed by a slice manager (e.g., slice manager 320) and an API-GW (e.g., API-GW 310) to provide requested enterprise services/service options to an enterprise (e.g., the enterprise associated with enterprise network 350) via an mobile network services/service options that can be implemented via an enterprise slice.

At 802, the operations may include determining by the API-GW, responsive to enterprise service template inputs (e.g., parameters received via the API), one or more mobile network services to be provided to a plurality of enterprise devices of the enterprise, one or more service options associated with the one or more mobile network services, one or more assurance data types, and one or more assurance data presentation formats. In at least one embodiment, the operations at 802 may be performed following storing of inputs received by the API-GW from the enterprise network.

At 804, the operations may include identifying an enterprise slice type to provide the one or more mobile network services/service options to the enterprise devices. In at least one embodiment, the enterprise slice type may be identified by the API-GW based on the one or more enterprise services/service options requested by the enterprise. Recall, the slice manager may communicate at least a portion of slice information including the slice type identifying indicators and mobile network services/service options associated with each slice type to the API-GW following translation (e.g., as discussed at 502 and 504 of FIG. 5).

In at least one embodiment, the API-GW may identify an enterprise slice type to provide the one or more mobile network services/service options to the enterprise by correlating the inputs (e.g., enterprise requests) for enterprise services, service options, and assurance data/formats to mobile network services, service options, and assurance data/formats that can be provided via enterprise slices of the mobile network and determining a best match to available slice types stored on the API-GW that satisfy the enterprise requests. In some embodiments, the determining at 806 may include the API-GW determining whether the enterprise is authorized to receive the services/service options requested (e.g., based on services/service options that have been contracted for between the enterprise and the MNO/SP).

At 806, the operations may include the API-GW communicating the identified enterprise slice type (e.g., the indicator corresponding to the identified (potentially best match) slice type), the enterprise device identities, the service/service options, and the assurance data types to the slice manager.

At 808, the operations may include the slice manager, based on the enterprise slice type, determining whether there is an existing validated enterprise slice type suitable to provide the one or more mobile network services to the enterprise. In at least one embodiment, the determining at 808 may include the slice manager determining a best match to available slice types based on the slice type identified to the slice manager by the API-GW in combination with the services, service options, and assurance data/formats requested by the enterprise.

Based on a determination at 808 that there is an existing validated enterprise slice type suitable to provide the mobile network services, the operations may include, at 810, the slice manager determining whether there is an enterprise slice instance of the enterprise slice type available to handle potential capacity demands that may be incurred by providing the one or more mobile network services to the enterprise devices of the enterprise. In some embodiments, determining whether there is a slice instance available to handle potential capacity demands may be based on how many sessions a slice may support and how many are not already 'reserved' based on prior requests to use a given slice instance. In still some embodiments, the determining may be based on maximum throughput for a given geography served by a slice. In still some embodiments, the determining may be based on an average rate of APIs call served. Other variations can be envisioned in various embodiments.

Based on a determination at 810 that there is an enterprise slice instance of the enterprise slice type available to handle the potential capacity demands, the operations may include provisioning the enterprise slice instance at 812 and managing the enterprise slice operation at 814. Respective operations at 812 and 814 may be performed as discussed above at respective operations 714 and 716. Additionally, respective optional operations at 822 and 824 may be optionally be performed as discussed above at respective operations 718 and 720.

Returning to 808, based on a determination that there is no suitable existing validated enterprise slice type to provide the one or more mobile network services, the operations may include, at 816, performing a translation of the one or more mobile network services/service options to generate a new validated enterprise slice type. In at least one embodiment, performing the translation of the one or more mobile network services/service options to generate a new validated enterprise slice type may be performed as discussed above at least at 502 and 504 of FIG. 5.

Following the operations at 816, the operations may continue to 818 at which the operations may include instantiating a new enterprise slice instance for the validated enterprise slice type. Following the operations at 818, the operations may continue to 812 and continue therefrom, as discussed herein.

Returning to 810, based on a determination that there is no enterprise slice instance available to handle the potential capacity demands, the operations may continue to 820 at which a new enterprise slice instance of the existing enterprise slice type determined at 808 may be instantiated by the slice manager to handle the capacity or an existing slice instance may be extended to handle the capacity and the operations may continue to 812 and continue therefrom, as discussed herein.

Figure 9:
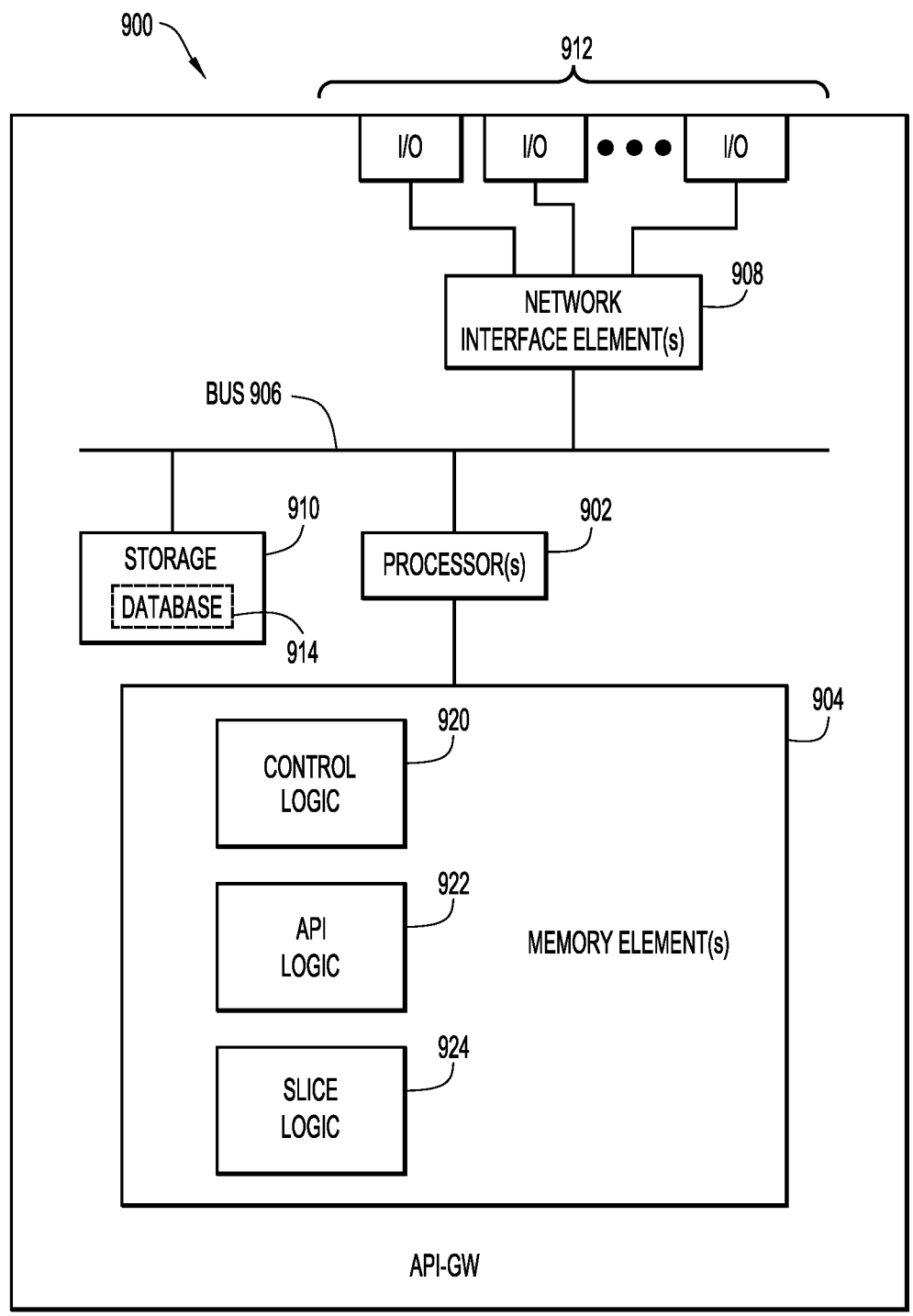
FIG. 9 is a simplified block diagram illustrating example details associated with a gateway for implementing operations described herein, according to an example embodiment.

Referring to FIG. 9, FIG. 9 is a simplified block diagram illustrating example details associated with an API-GW 900 for implementing operations described herein, according to an example embodiment. In at least one embodiment, API-GW 900 may provide operations associated with an API-GW within a mobile network as discussed herein such as, for example, API-GW 310 of mobile network 302, as illustrated in FIG. 3.

The embodiment of FIG. 9 illustrates API-GW 900, which includes one or more processor(s) 902, one or more memory element(s) 904, a bus 906, one or more network interface element(s) 908, and storage 910. Memory element(s) 904 may include instructions for control logic 920, API logic 922, and slice logic 924. Storage 910 may include a database 914, for example, to store enterprise slice information for one or more enterprise slices/slice types, as discussed herein.

In at least one embodiment, processor(s) 902 is/are at least one hardware processor configured to execute various tasks, operations, and/or functions for API-GW 900 as described herein according to software and/or instructions configured for API-GW 900. In at least one embodiment, memory element(s) 904 is/are configured to store data, information, software and/or instructions associated with API-GW 900 and logic configured for memory element(s) 904. In at least one embodiment, bus 906 can be configured as an interface that enables one or more elements of API-GW 900 (e.g., network interface element(s) 908, processor(s) 902, memory element(s) 904 (and logic, applications, etc. configured therein), etc. to communicate in order to exchange information and/or data, to perform operations, etc. In at least one embodiment, a fast kernel-hosted interconnect may be employed for API-GW 900, potentially using shared memory between processes (e.g., logic, etc.), which can enable efficient communication paths between the processes.

In various embodiments, network interface element(s) 908 enables communications (wired or wireless) between API-GW 900 and other network elements or nodes, via one or more input/output (I/O) elements 912 (e.g., ports, transceivers, etc.) at which data, information, etc. is received and transmitted to facilitate operations discussed for various embodiments described herein. In some embodiments, network interface element(s) 908 can be configured with one or more Ethernet driver(s) and/or controller(s), one or more Fibre Channel (FC) driver(s) and/or controllers, one or more Radio Frequency (RF) driver(s) and/or controllers (e.g., for WiFi or any other unlicensed spectrum communications, for 3GPP or any other licensed spectrum communications, and/or or any other similar network interface driver(s) and/or controller(s) to enable communications for API-GW 900 within a communication system (e.g., communication system 300). API-GW 900 can include any suitable interfaces for receiving, transmitting, and/or otherwise communicating data and/or information in a network environment.

In various embodiments, storage 910 can be configured to store data, information and/or instructions associated with API-GW 900 and/or logic configured for memory element(s) 904. Note that in certain examples, storage 910 can be consolidated with memory elements 904 (or vice versa), and/or the storage/memory elements can overlap/exist in any other suitable manner.

In various embodiments, control logic 920 can include instructions that, when executed (e.g., by processor(s) 902) cause API-GW 900 to perform operations, which can include, but not be limited to: performing control, management, etc. operations associated with API-GW 900; cooperating and/or interacting with other logic (internal and/or external to API-GW 900); maintaining and/or interacting with stored data, information, parameters; combinations thereof; and/or the like to facilitate various operations as discussed for various embodiments described herein.

In various embodiments, API logic 922 may include instructions that, when executed (e.g., by processor(s) 902) may facilitate various operations including, but not limited to: receiving/transmitting API procedure calls (e.g., via an API such as API 318 in communication with one or more enterprise hosted application(s) within an enterprise network(s)); providing enterprise exposure and control over (e.g., for provisioning) mobile network services that may be provided via an enterprise slice for enterprise devices associated with one or more enterprises (e.g., for shared enterprise slices) for one or more contracted mobile network services of the one or more enterprises; providing authentication/authorization operations associated with on-boarding one or more enterprises to access/interact with one or more enterprise service templates; receiving inputs provided to an enterprise service template; cooperating and/or interacting with other logic (internal and/or external to API-GW 900); maintaining and/or interacting with stored data, information, parameters; combinations thereof; and/or the like to facilitate various operations as discussed for various embodiments described herein.

In at least one embodiment, slice logic 924 can include instructions that, when executed (e.g., by processor(s) 902) cause API-GW 900 to perform operations, which can include, but not be limited to: facilitating communications/exchanges with a slice manager within a mobile network (e.g., slice manager 320 within mobile network 302) for various operations discussed herein; identifying an enterprise slice type based on enterprise service template inputs (e.g., parameter input field inputs such as selections, assignments, etc.) received from an enterprise network (e.g. via API logic, etc.); cooperating and/or interacting with other logic (internal and/or external to API-GW 900); maintaining and/or interacting with stored data, information, parameters; combinations thereof; and/or the like to facilitate various operations as discussed for various embodiments described herein.

In various embodiments, memory element(s) 904 may include any suitable memory element such as random access memory (RAM), dynamic RAM (DRAM), static RAM (SRAM), and/or cache memory. In general, memory element(s) 904 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 910 may include any suitable storage such as persistent storage, which may be a magnetic disk drive, a solid state hard drive, a semiconductor storage device, read only memory (ROM), an erasable programmable read only memory (EPROM), flash memory, or any other computer readable storage media, which may be inclusive of non-transitory tangible media and/or non-transitory computer readable storage media, that is capable of storing program/logic/software instructions and/or digital information. In some embodiments, the media used by storage 910 may also be removable. For example, a removable hard drive may be used for storage 910. Other examples include optical and magnetic disks, thumb drives, and smart cards that are inserted into a drive for transfer onto another computer readable storage medium that is also part of storage 910.

Figure 10:
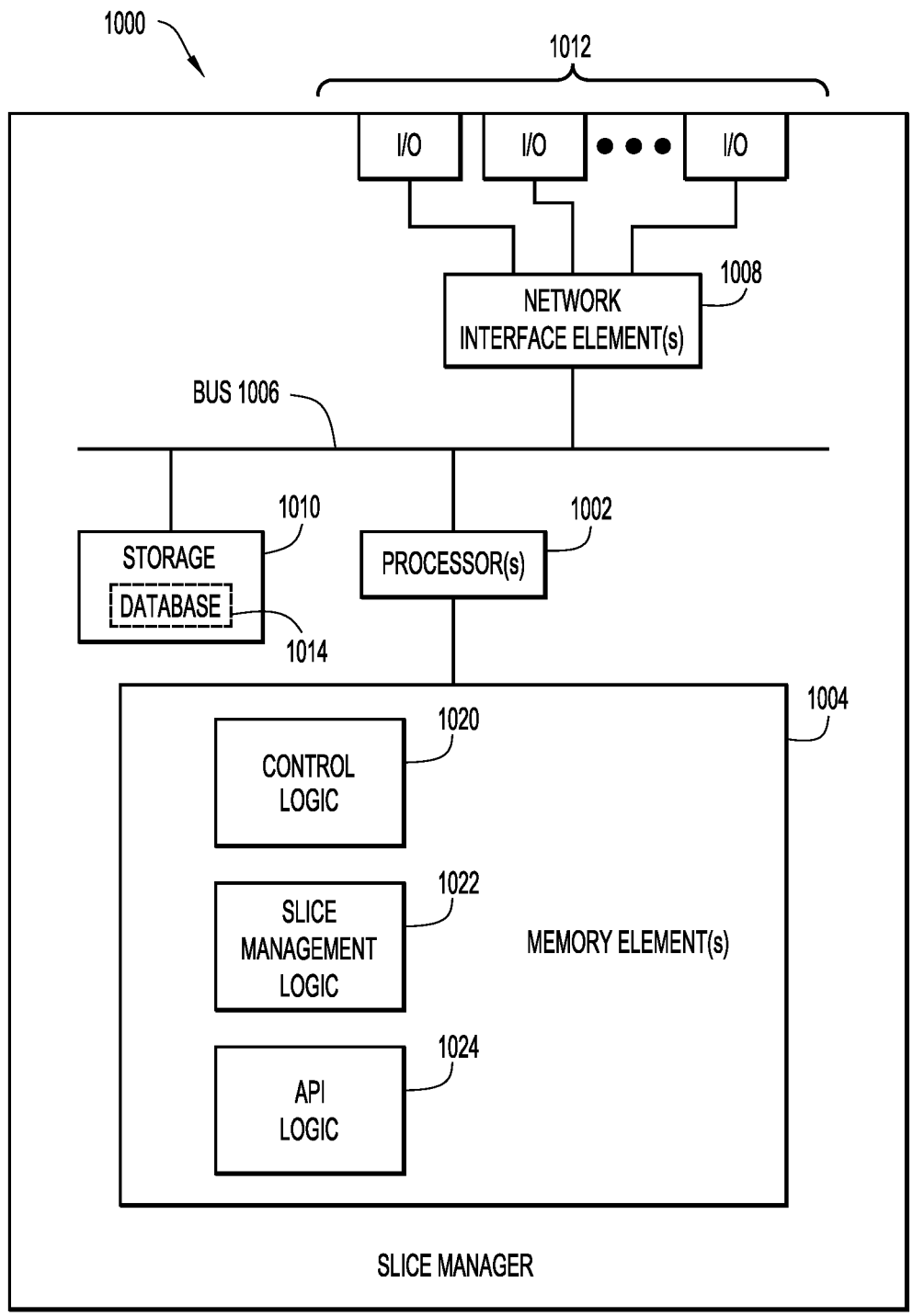
FIG. 10 is a simplified block diagram illustrating example details associated with a slice manager for implementing operations described herein, according to an example embodiment.

Referring to FIG. 10, FIG. 10 is a simplified block diagram illustrating example details associated with a slice manager 1000 for implementing operations described herein, according to an example embodiment. In at least one embodiment, slice manager 1000 may provide operations associated with a slice manager within a mobile network as discussed herein such as, for example, slice manager 320 of mobile network 302, as illustrated in FIG. 3.

The embodiment of FIG. 10 illustrates slice manager 1000, which includes one or more processor(s) 1002, one or more memory element(s) 1004, a bus 1006, one or more network interface element(s) 1008, and storage 1010. Memory element(s) 1004 may include instructions for control logic 1020, slice management logic 1022, and API logic 1024. Storage 1010 may include a database 1014, for example, to store enterprise slice information for one or more enterprise slices/slice types, mobile network resource information (e.g., hardware, software, and/or networking resources for instantiating/operating various enterprise slice types/slice instances/VNFs), and/or any other information as discussed herein.

In at least one embodiment, processor(s) 1002 is/are at least one hardware processor configured to execute various tasks, operations, and/or functions for slice manager 1000 as described herein according to software and/or instructions configured for slice manager 1000. In at least one embodiment, memory element(s) 1004 is/are configured to store data, information, software and/or instructions associated with slice manager 1000 and logic configured for memory element(s) 1004. In at least one embodiment, bus 1006 can be configured as an interface that enables one or more elements of slice manager 1000 (e.g., network interface element(s) 1008, processor(s) 1002, memory element(s) 1004 (and logic, applications, etc. configured therein), etc. to communicate in order to exchange information and/or data, to perform operations, etc. In at least one embodiment, a fast kernel-hosted interconnect may be employed for slice manager 1000, potentially using shared memory between processes (e.g., logic, etc.), which can enable efficient communication paths between the processes.

In various embodiments, network interface element(s) 1008 enables communications (wired or wireless) between slice manager 1000 and other network elements or nodes, via one or more input/output (I/O) elements 1012 (e.g., ports, transceivers, etc.) at which data, information, etc. is received and transmitted to facilitate operations discussed for various embodiments described herein. In some embodiments, network interface element(s) 1008 can be configured with one or more Ethernet driver(s) and/or controller(s), one or more Fibre Channel (FC) driver(s) and/or controllers, one or more Radio Frequency (RF) driver(s) and/or controllers (e.g., for WiFi or any other unlicensed spectrum communications, for 3GPP or any other licensed spectrum communications, and/or or any other similar network interface driver(s) and/or controller(s) to enable communications for slice manager 1000 within a communication system (e.g., communication system 300). Slice manager 1000 can include any suitable interfaces for receiving, transmitting, and/or otherwise communicating data and/or information in a network environment.

In various embodiments, storage 1010 can be configured to store data, information and/or instructions associated with slice manager 1000 and/or logic configured for memory element(s) 1004. Note that in certain examples, storage 1010 can be consolidated with memory elements 1004 (or vice versa), and/or the storage/memory elements can overlap/exist in any other suitable manner.

In various embodiments, control logic 1020 can include instructions that, when executed (e.g., by processor(s) 1002) cause slice manager 1000 to perform operations, which can include, but not be limited to: performing control, management, etc. operations associated with slice manager 1000; cooperating and/or interacting with other logic (internal and/or external to slice manager 1000); maintaining and/or interacting with stored data, information, parameters; combinations thereof; and/or the like to facilitate various operations as discussed for various embodiments described herein.

In at least one embodiment, slice management logic 1022 can include instructions that, when executed (e.g., by processor(s) 1002) cause slice manager 1000 to perform operations, which can include, but not be limited to: performing translation operations for different enterprise slice types (e.g., preparing, commissioning, and validating enterprise slice types); managing operations of one or more enterprise slice types/slices; facilitating communications/exchanges with an API-GW within a mobile network for various operations discussed herein; identifying an enterprise slice type based on information received from an API-GW; determining whether there is an existing validated slice type suitable to provide mobile network services requested by one or more enterprises, determining whether there is an enterprise slice of an existing validated enterprise slice type to handle potential capacity demands for one or more enterprises; provisioning enterprise slices; cooperating and/or interacting with other logic (internal and/or external to slice manager); maintaining and/or interacting with stored data, information, parameters; combinations thereof; and/or the like to facilitate various operations as discussed for various embodiments described herein.

In various embodiments, API logic 1024 may include instructions that, when executed (e.g., by processor(s) 1002) may facilitate various operations including, but not limited to: receiving/transmitting API procedure calls via API logic configured for an API-GW to facilitate the exchange of data and/or information and/or to perform various operations that may be associated with providing mobile network services to one or more enterprises via one or more enterprise slices; cooperating and/or interacting with other logic (internal and/or external to slice manager 1000); maintaining and/or interacting with stored data, information, parameters; combinations thereof; and/or the like to facilitate various operations as discussed for various embodiments described herein.

In various embodiments, memory element(s) 1004 may include any suitable memory element such as RAM, DRAM, SRAM, and/or cache memory. In general, memory element(s) 1004 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 1010 may include any suitable storage such as persistent storage, which may be a magnetic disk drive, a solid state hard drive, a semiconductor storage device, ROM, an EPROM, flash memory, or any other computer readable storage media, which may be inclusive of non-transitory tangible media and/or non-transitory computer readable storage media, that is capable of storing program/logic/software instructions and/or digital information. In some embodiments, the media used by storage 1010 may also be removable. For example, a removable hard drive may be used for storage 1010. Other examples include optical and magnetic disks, thumb drives, and smart cards that are inserted into a drive for transfer onto another computer readable storage medium that is also part of storage 1010.

Figure 11:
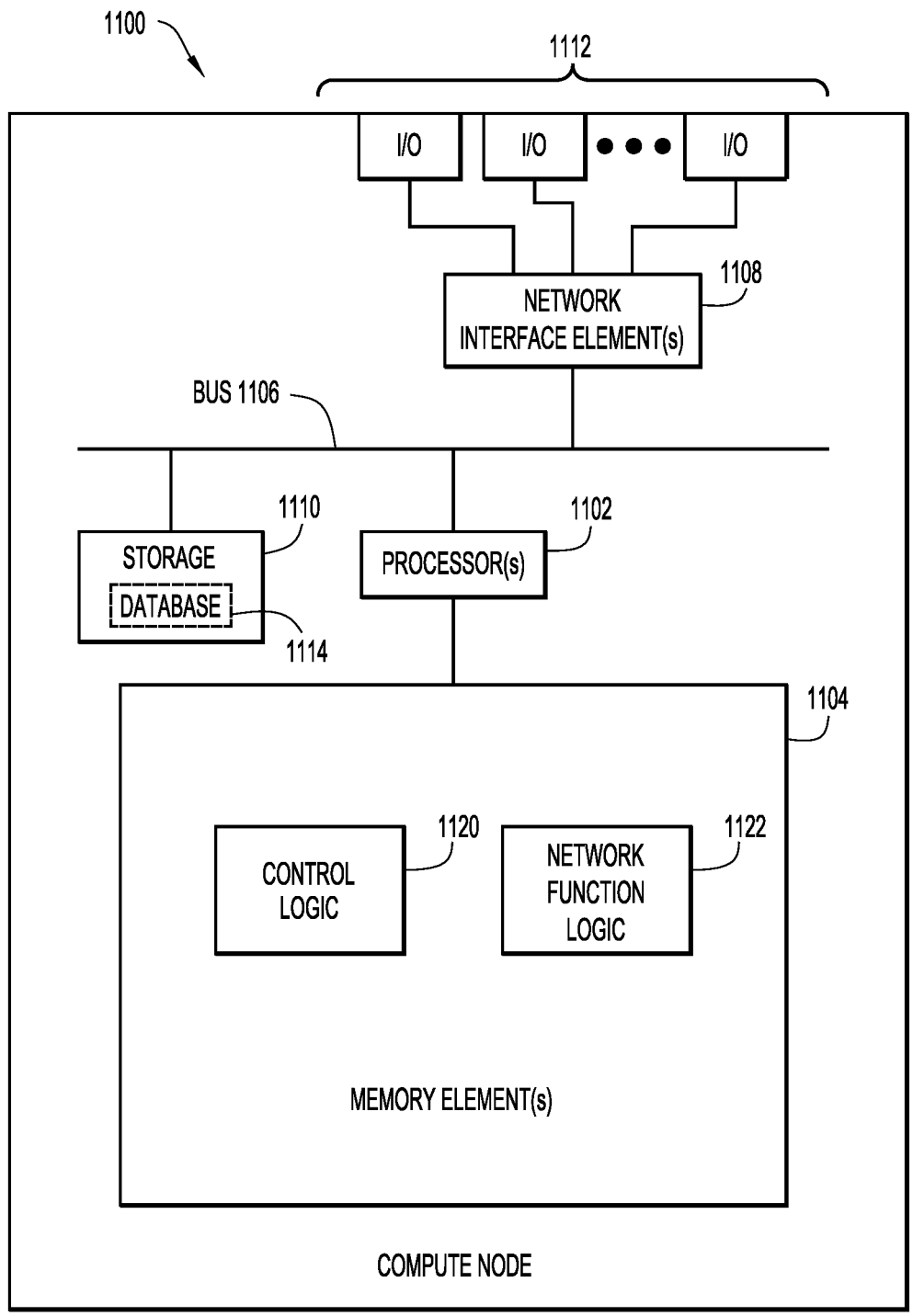
FIG. 11 is a simplified block diagram illustrating example details associated with a compute node for implementing operations described herein, according to an example embodiment.

Referring to FIG. 11, FIG. 11 is a simplified block diagram illustrating example details associated with a compute node 1100 for implementing operations described herein, according to an example embodiment. In at least one embodiment, one or more compute nodes 1100 may facilitate operations associated with any VNFs, combination of VNFs, etc. of any enterprise slices of any enterprise slice type that may be instantiated and operated within a mobile network such as, for example, any VNFs of any of enterprise slices 330A-330B of mobile network 302, as illustrated in FIG. 3.

The embodiment of FIG. 11 illustrates compute node 1100, which includes one or more processor(s) 1102, one or more memory element(s) 1104, a bus 1106, one or more network interface element(s) 1108, and storage 1110. Memory element(s) 1104 may include instructions for control logic 1120 and network function logic 1122. In at least one embodiment, storage 1110 may include a database 1114 for information that may be stored and/or utilized by compute node 1100.

In at least one embodiment, processor(s) 1102 is/are at least one hardware processor configured to execute various tasks, operations, and/or functions for compute node 1100 as described herein according to software and/or instructions configured for compute node 1100. In at least one embodiment, memory element(s) 1104 is/are configured to store data, information, software and/or instructions associated with compute node 1100 and logic configured for memory element(s) 1104. In at least one embodiment, bus 1106 can be configured as an interface that enables one or more elements of compute node 1100 (e.g., network interface element(s) 1108, processor(s) 1102, memory element(s) 1104 (and logic, applications, etc. configured therein), etc. to communicate in order to exchange information and/or data, to perform operations, etc. In at least one embodiment, a fast kernel-hosted interconnect may be employed for compute node 1100, potentially using shared memory between processes (e.g., logic, etc.), which can enable efficient communication paths between the processes.

In various embodiments, network interface element(s) 1108 enables communications (wired or wireless) between compute node 1100 and other network elements or nodes, via one or more input/output (I/O) elements 1112 (e.g., ports, transceivers, etc.) at which data, information, etc. is received and transmitted to facilitate operations discussed for various embodiments described herein. In some embodiments, network interface element(s) 1108 can be configured with one or more Ethernet driver(s) and/or controller(s), one or more Fibre Channel (FC) driver(s) and/or controllers, one or more Radio Frequency (RF) driver(s) and/or controllers (e.g., for WiFi or any other unlicensed spectrum communications, for 3GPP or any other licensed spectrum communications, and/or or any other similar network interface driver(s) and/or controller(s) to enable communications for compute node 1100 within a communication system (e.g., communication system 300). Compute node 1100 can include any suitable interfaces for receiving, transmitting, and/or otherwise communicating data and/or information in a network environment.

In various embodiments, storage 1110 can be configured to store data, information and/or instructions associated with compute node 1100 and/or logic configured for memory element(s) 1104. Note that in certain examples, storage 1110 can be consolidated with memory elements 1104 (or vice versa), and/or the storage/memory elements can overlap/exist in any other suitable manner.

In various embodiments, control logic 1120 can include instructions that, when executed (e.g., by processor(s) 1002) cause compute node 1100 to perform operations, which can include, but not be limited to: performing control, management, etc. operations associated with compute node 1100; cooperating and/or interacting with other logic (internal and/or external to compute node 1100); maintaining and/or interacting with stored data, information, parameters; combinations thereof; and/or the like to facilitate various operations as discussed for various embodiments described herein.

In at least one embodiment, network function logic 1122 can include instructions that, when executed (e.g., by processor(s) 1102) cause compute node 1100 to perform operations that may be associated with one or more network element(s) associated with one or more enterprise slices (e.g., any UPFs, SMFs, AMFs, PCFs, PGW-Cs, SGW-Cs, PGW-Us, SGW-Us MMES, PCRFs, and/or any other 3GPP network elements that may be associated with one or more enterprise slices); cooperating and/or interacting with other logic (internal and/or external to compute node 1100); maintaining and/or interacting with stored data, information, parameters; combinations thereof; and/or the like to facilitate various operations as discussed for various embodiments described herein.

In various embodiments, memory element(s) 1104 may include any suitable memory element such as RAM, DRAM, SRAM, and/or cache memory. In general, memory element(s) 1004 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 1110 may include any suitable storage such as persistent storage, which may be a magnetic disk drive, a solid state hard drive, a semiconductor storage device, ROM, an EPROM, flash memory, or any other computer readable storage media, which may be inclusive of non-transitory tangible media and/or non-transitory computer readable storage media, that is capable of storing program/logic/software instructions and/or digital information. In some embodiments, the media used by storage 1110 may also be removable. For example, a removable hard drive may be used for storage 1110. Other examples include optical and magnetic disks, thumb drives, and smart cards that are inserted into a drive for transfer onto another computer readable storage medium that is also part of storage 1110.

As discussed herein, enterprises wish to extend intent (e.g., desired control) to an SP/MNO mobile network, while the MNO/SP may desire to offer such services whilst maintaining integrity of their network by utilizing 4G CUPS/5G network slicing approaches. The essence of techniques described herein are that the template-based approach constrains the impact on the MNO/SP 3GPP-standardised network in a manner defined by the MNO/SP whilst permitting the enterprise intent (e.g., desired control) to be applied to the network in the form of an enterprise slice. Thus, typical demands that might otherwise be imposed as a result of 3GPP standards are relaxed in a template-controlled manner in order to satisfy the enterprise intent. Slicing is an optional implementation for the SP to meet the template that is sold (e.g., contracted) but that is not the only method to implement the intent.

In various embodiments, the template approach allows the MNO/SP to: constrain the services offered to a subset of capabilities that have clear business Return on Investment (RoI); assess resource consumption prior to an enterprise making use of a slice-based service offering; determine the likely SLA that will be offered as a result of using that slice; present the permitted level of control, visibility and security for which an enterprise has contracted; and/or provide clear cost metrics to allow for predictable margins and accounting.

In a further extension of techniques described herein, an industry forum of a pseudo standard (e.g., a Cisco® consortium) could be used provide a set of approved templates that MNOs/SPs could expose to provide a uniform set of templates to enterprises.

The operations described herein may be identified based upon the application for which they are implemented in a specific embodiment. However, it should be appreciated that any particular operation nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer, compute node, or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Note that in certain example implementations, operations as outlined herein may be implemented by logic encoded in one or more tangible media, which may be inclusive of non-transitory tangible media and/or non-transitory computer readable storage media (e.g., embedded logic provided in an application specific integrated circuit (ASIC), in digital signal processing (DSP) instructions, software [potentially inclusive of object code and source code] to be executed by a processor, or other similar machine, etc.). In some of these instances, a memory element or storage can store data used for operations described herein. This includes memory elements or storage being able to store software, logic, code, and/or processor instructions that are executed to carry out operations described herein. A processor (e.g., a hardware processor) can execute any type of instructions associated with data to achieve the operations detailed herein. In one example, a processor may transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM), or an ASIC that includes digital logic, software, code, electronic instructions, or any suitable combination thereof.

In one example implementation, a compute node or a network element can encompass network appliances, routers, servers, switches, gateways, bridges, load balancers, firewalls, processors, modules, or any other suitable device, component, element, or object operable to exchange information that facilitates or otherwise helps to facilitate various operations as described for various embodiments discussed herein in a network environment (e.g., for systems and/or networks such as those presented herein).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

Elements and/or systems discussed for various embodiments described herein can couple to one another through simple interfaces (as illustrated) and/or through any other suitable connection (wired or wireless), which provides a viable pathway for network communications. As referred to herein, a physical (wired or wireless) interconnection or interface can refer to an interconnection of one element with one or more other element(s), while a logical interconnection or interface can refer to communications, interactions and/or operations of elements with each other, which can be directly or indirectly interconnected, in a network environment. Additionally, any one or more of the elements and/or systems may be combined or removed from a given deployment based on a particular configuration and/or implementation.

In various embodiments, systems and/or networks discussed herein may implement user datagram protocol/Internet Protocol (UDP/IP) connections and/or transmission control protocol/IP (TCP/IP) communication language protocol in particular embodiments of the present disclosure. However, systems and/or networks discussed herein can alternatively implement any other suitable communication protocol, interface and/or standard, proprietary and/or non-proprietary, for transmitting and receiving messaging and/or signaling. Other protocols, interfaces and/or communication standards that can be used in systems and/or networks discussed herein can include 3GPP Diameter-based protocols, Remote Authentication Dial-In User Service (RADIUS) protocols, Authentication, Authorization and Accounting (AAA) signaling, a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), API-based (e.g., via API 318), combinations thereof or the like. In some embodiments, secure communications can be facilitated using TCP/IP Secure Sockets Layer (SSL) communications.

In various embodiments, systems and/or networks discussed herein can represent a series of points or elements of interconnected communication paths (wired or wireless) for receiving and transmitting packets of information that propagate through the systems and/or networks. In various embodiments, systems and/or networks can be associated with and/or provided by a single network operator or service provider and/or multiple network operators or service providers. In various embodiments, systems and/or networks can include and/or overlap with, in whole or in part, one or more packet data network(s). Systems and/or networks presented herein may offer communicative interfaces between various elements of the systems and/or networks and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment A mobile network, such as mobile networks presented herein, through which communications propagate in can use any suitable technologies for communication including wireless (e.g., 3G/4G/5G/nG network, Institute of Electrical and Electronics Engineers (IEEE) Standard 802.11™-2012, published Mar. 29, 2012 (e.g., WiFi), WiMax, IEEE Standard 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Note that in this disclosure, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein this Specification, can be inclusive of an executable file comprising instructions that can be understood and processed on a computer, processor, machine, compute node, combinations thereof, or the like and may further include library modules loaded during execution, object files, system files, hardware logic, software logic, and/or any other executable modules.

The embodiments presented may be implemented in various forms, such as a system, a method, and/or a computer program product at any possible technical detail level of integration. The computer program product may include a non-transitory computer readable storage medium (or media) having computer readable program instructions thereon for causing a processor to carry out aspects of operations presented herein.

It is also important to note that the operations and steps described with reference to the preceding FIGs. illustrate only some of the possible scenarios that may be executed by, or within, a communication system/mobile network/enterprise network. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interactions may be described in terms of one, two, three, or four elements. However, this has been done for purposes of clarity and example only. In certain cases, it may be easier to describe one or more of the functionalities by only referencing a limited number of network elements. It should be appreciated that networks discussed herein (and their teachings) are readily scalable and can accommodate a large number of components, as well as more complicated/sophisticated arrangements and configurations. Accordingly, the examples provided should not limit the scope or inhibit the broad teachings of networks discussed herein as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols, networks discussed herein may be applicable to other exchanges or routing protocols, interfaces, and/or communications standards, proprietary and/or non-proprietary. Moreover, although networks described herein have been illustrated with reference to particular elements and operations that facilitate processes, these elements, and operations may be replaced by any suitable architecture or process that achieves the intended functionality of networks described herein.

What is claimed is:

1. A method comprising:
providing an enterprise service template to an enterprise, the enterprise service template comprising parameter input fields for indicating enterprise devices associated with the enterprise, services to be provided to the enterprise devices using a mobile network, and service options associated with the services, wherein the enterprise is authorized, based on one or more credentials, to interface with the enterprise service template;
determining, responsive to enterprise service template inputs to the parameter input fields, one or more mobile network services to be provided to a plurality of enterprise devices and one or more service options associated with the one or more mobile network services;
identifying, based on the one or more mobile network services and the one or more service options associated with the one or more mobile network services determined from the enterprise service template inputs to the parameter input fields, an enterprise slice type to provide the one or more mobile network services, wherein the enterprise slice type is validated to provide the one or more mobile network services; and
provisioning an enterprise slice instance of the enterprise slice type based on the one or more mobile network services, the plurality of enterprise devices, and the one or more service options associated with the one or more mobile network services.

2. The method of claim 1, wherein providing the enterprise service template further comprises:
providing the enterprise service template to the enterprise using an application programming interface (API) gateway of the mobile network.

3. The method of claim 2, wherein the API gateway identifies the enterprise slice type based on the one or more mobile network services to be provided to the plurality of enterprise devices determined from the enterprise service template inputs to the parameter input fields, the identifying further comprising:
communicating, from the API gateway to a slice manager of the mobile network, an identification of the enterprise slice type.

4. The method of claim 3, further comprising:
determining, by the slice manager, whether an existing enterprise slice type is suitable to provide the one or more mobile network services to the plurality of enterprise devices.

5. The method of claim 4, further comprising:
based on a determination that an existing enterprise slice type is suitable to provide the one or more mobile network services to the plurality of enterprise devices, the provisioning is performed for a plurality of virtualized network functions of an enterprise slice instance of the existing enterprise slice type.

6. The method of claim 4, further comprising:
based on a determination that no existing enterprise slice type is suitable to provide the one or more mobile network services to the plurality of enterprise devices, generating a new enterprise slice type that is validated to provide the one or more mobile network services based on an enterprise service model configured for the enterprise, and instantiating a new enterprise slice instance of the new enterprise slice type, the new enterprise slice instance comprising a plurality of virtualized network functions, wherein the provisioning is performed for the plurality of virtualized network functions of the new enterprise slice instance.

7. The method of claim 4, wherein determining, by the slice manager, whether an existing enterprise slice type is suitable to provide the mobile network services to the plurality of enterprise devices further comprises determining whether a plurality of virtualized network functions of an existing slice instance of the existing enterprise slice type have capacity to meet expected demand for the one or more mobile network services to be provided to the plurality of enterprise devices.

8. The method of claim 1, wherein the enterprise service template further comprises parameter input fields for identifying a plurality of assurance data types and for identifying a plurality of assurance data formats for presenting assurance data to the enterprise, wherein the assurance data types are associated with the one or more mobile network services to be provided to one or more of the plurality of enterprise devices.

9. The method of claim 1, wherein the one or more service options are presented in the enterprise service template utilizing enterprise specific terminology and comprise at least one of:
policies associated with the services to be provided to the enterprise devices;
a geographic location associated with the services to be provided to the enterprise devices; and
security options associated with the services to be provided to the enterprise devices.

10. The method of claim 1, wherein the identifying further comprises:
identifying a best match to available enterprise slice types for the enterprise based on the one or more mobile network services and the one or more service options associated with the one or more mobile network services determined from the enterprise service template inputs to the parameter input fields.

11. One or more non-transitory computer readable storage media encoded with instructions that, when executed by a processor, cause the processor to perform operations, comprising:
providing an enterprise service template to an enterprise, the enterprise service template comprising parameter input fields for indicating enterprise devices associated with the enterprise, services to be provided to the enterprise devices using a mobile network, and service options associated with the services, wherein the enterprise is authorized, based on one or more credentials, to interface with the enterprise service template;
determining, responsive to enterprise service template inputs to the parameter input fields, one or more mobile network services to be provided to a plurality of enterprise devices and one or more service options associated with the one or more mobile network services;
identifying, based on the one or more mobile network services and the one or more service options associated with the one or more mobile network services determined from the enterprise service template inputs to the parameter input fields, an enterprise slice type to provide the one or more mobile network services, wherein the enterprise slice type is validated to provide the one or more mobile network services; and provisioning an enterprise slice instance of the enterprise slice type based on the one or more mobile network services, the plurality of enterprise devices, and the one or more service options associated with the one or more mobile network services.

12. The media of claim 11, further comprising instructions that, when executed by the processor, cause the processor to perform further operations, comprising:
determining whether an existing enterprise slice type is suitable to provide the one or more mobile network services to the plurality of enterprise devices.

13. The media of claim 12, further comprising instructions that, when executed by the processor, cause the processor to perform further operations, comprising:
based on a determination that an existing enterprise slice type is suitable to provide the one or more mobile network services to the plurality of enterprise devices, the provisioning is performed for a plurality of virtualized network functions of an enterprise slice instance of the existing enterprise slice type.

14. The media of claim 12, further comprising instructions that, when executed by the processor, cause the processor to perform further operations, comprising:
based on a determination that no existing enterprise slice type is suitable to provide the one or more mobile network services to the plurality of enterprise devices, generating a new enterprise slice type that is validated to provide the one or more mobile network services based on an enterprise service model configured for the enterprise, and instantiating a new enterprise slice instance of the new enterprise slice type, the new enterprise slice instance comprising a plurality of virtualized network functions, wherein the provisioning is performed for the plurality of virtualized network functions of the new enterprise slice instance.

15. The media of claim 12, wherein determining whether an existing enterprise slice type is suitable to provide the mobile network services to the plurality of enterprise devices further comprises determining whether a plurality of virtualized network functions of an existing slice instance of the existing enterprise slice type have capacity to meet expected demand for the one or more mobile network services to be provided to the plurality of enterprise devices.

16. The media of claim 11, wherein the enterprise service template further comprises parameter input fields for identifying a plurality of assurance data types and for identifying a plurality of assurance data formats for presenting assurance data to the enterprise, wherein the assurance data types are associated with the one or more mobile network services to be provided to one or more of the plurality of enterprise devices.

17. A system comprising:
at least one memory element for storing data; and
at least one processor for executing instructions associated with the data, wherein executing the instructions causes the system to perform operations, comprising:
providing an enterprise service template to an enterprise, the enterprise service template comprising parameter input fields for indicating enterprise devices associated with the enterprise, services to be provided to the enterprise devices using a mobile network, and service options associated with the services, wherein the enterprise is authorized, based on one or more credentials, to interface with the enterprise service template;
determining, responsive to service template inputs to the parameter input fields, one or more mobile network services to be provided to a plurality of enterprise devices and one or more service options associated with the one or more mobile network services;
identifying, based on the one or more mobile network services and the one or more service options associated with the one or more mobile network services determined from the enterprise service template inputs to the parameter input fields, an enterprise slice type to provide the one or more mobile network services, wherein the enterprise slice type is validated to provide the one or more mobile network services; and
provisioning an enterprise slice instance of the enterprise slice type based on the one or more mobile network services, the plurality of enterprise devices, and the one or more service options associated with the one or more mobile network services.

18. The system of claim 17, wherein providing the enterprise service template further comprises:
providing the enterprise service template to the enterprise using an application programming interface (API) gateway of the mobile network.

19. The system of claim 18, wherein the API gateway identifies the enterprise slice type based on the one or more mobile network services to be provided to the plurality of enterprise devices determined from the enterprise service template inputs to the parameter input fields, the identifying further comprising:
communicating, from the API gateway to a slice manager of the mobile network, an identification of the enterprise slice type.

20. The system of claim 19, wherein executing the instructions causes the system to perform further operations, comprising:
determining, by the slice manager, whether an existing enterprise slice type is suitable to provide the one or more mobile network services to the plurality of enterprise devices.

\* \* \* \* \*